US012399554B2

United States Patent
Koo et al.

(10) Patent No.: US 12,399,554 B2
(45) Date of Patent: Aug. 26, 2025

(54) AUGMENTED REALITY DEVICE AND METHOD FOR DETECTING USER'S GAZE

(71) Applicant: SAMSUNG ELECTRONICS CO., LTD., Suwon-si (KR)

(72) Inventors: Bonkon Koo, Suwon-si (KR); Sunghwan Shin, Suwon-si (KR); Youngmo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 689 days.

(21) Appl. No.: 17/581,485

(22) Filed: Jan. 21, 2022

(65) Prior Publication Data

US 2022/0229490 A1 Jul. 21, 2022

Related U.S. Application Data

(63) Continuation of application No. PCT/KR2022/000682, filed on Jan. 13, 2022.

(30) Foreign Application Priority Data

| Jan. 21, 2021 | (KR) | 10-2021-0008942 |
| Jun. 28, 2021 | (KR) | 10-2021-0084155 |
| Sep. 28, 2021 | (KR) | 10-2021-0128345 |

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 2027/0138* (2013.01); *G02B 2027/0178* (2013.01)

(58) Field of Classification Search
CPC ... G02B 27/01–0189; G02B 2027/0105–0198; G06F 3/01–018
See application file for complete search history.

(56) References Cited

U.S. PATENT DOCUMENTS

| 8,032,842 B2 | 10/2011 | Kwon et al. |
| 9,426,447 B2 | 8/2016 | Lee et al. |

(Continued)

FOREIGN PATENT DOCUMENTS

| JP | 2003-225207 A | 8/2003 |
| JP | 2017-135605 A | 8/2017 |

(Continued)

OTHER PUBLICATIONS

Jixu Chen et al., "A Robust 3D Eye Gaze Tracking System using Noise Reduction", Proceedings of the 2008 Symposium on Eye Tracking Research & Applications, The Association for Computing Machinery, Inc., 2008, 8 pages total.

(Continued)

*Primary Examiner* — Christopher A Lamb, II
(74) *Attorney, Agent, or Firm* — Sughrue Mion, PLLC

(57) ABSTRACT

An augmented reality (AR) device for detecting a user's gaze and a method thereof are provided. The AR device includes a waveguide; a light reflector including a pattern; a support configured to fix the AR device to the user's face of the AR device; a light emitter and a light receiver installed on the support; and at least one processor, wherein the at least one processor is configured to control the light emitter to emit light toward the light reflector, identify the pattern based on the light received through the light receiver, and obtain gaze information of a user of the AR device based on the identified pattern.

15 Claims, 21 Drawing Sheets

(56) References Cited

U.S. PATENT DOCUMENTS

| | | | |
|---|---|---|---|
| 9,625,989 B2 | 4/2017 | Wilson et al. | |
| 10,268,290 B2 | 4/2019 | Trail et al. | |
| 10,698,204 B1 * | 6/2020 | Ouderkirk | G02B 27/0172 |
| 10,816,809 B2 | 10/2020 | Kim et al. | |
| 10,845,594 B1 * | 11/2020 | Lam | G02B 6/0053 |
| 11,150,469 B2 | 10/2021 | Petljanski et al. | |
| 11,237,628 B1 * | 2/2022 | Sharma | G02B 5/208 |
| 11,256,098 B2 | 2/2022 | Choi et al. | |
| 2011/0310238 A1 | 12/2011 | Koh et al. | |
| 2013/0077049 A1 | 3/2013 | Bohn | |
| 2014/0002444 A1 | 1/2014 | Bennett et al. | |
| 2016/0166146 A1 | 6/2016 | Sarkar | |
| 2018/0203505 A1 | 7/2018 | Trail et al. | |
| 2019/0361247 A1 | 11/2019 | Lanman et al. | |
| 2019/0392163 A1 | 12/2019 | Lake et al. | |
| 2020/0183155 A1 | 6/2020 | Xie et al. | |
| 2021/0011303 A1 | 1/2021 | Andreev et al. | |

FOREIGN PATENT DOCUMENTS

| | | | |
|---|---|---|---|
| JP | 2020-160141 A | 10/2020 | |
| KR | 10-0820639 B1 | 4/2008 | |
| KR | 10-0949743 B1 | 3/2010 | |
| KR | 10-1288447 B1 | 7/2013 | |
| KR | 10-1383235 B1 | 4/2014 | |
| KR | 10-2016-0057888 A | 5/2016 | |
| KR | 10-1769177 B1 | 8/2017 | |
| KR | 10-2018-0064413 A | 6/2018 | |
| KR | 10-2020-0080226 A | 7/2020 | |
| KR | 10-2021-0004776 A | 1/2021 | |

OTHER PUBLICATIONS

International Search Report and Written Opinion issued Apr. 19, 2022 by the International Searching Authority in counterpart International Patent Application No. PCT/KR2022/000682 (PCT/ISA/220, PCT/ISA/210 and PCT/ISA/237).

Extended European Search Report dated Mar. 21, 2024, issued by the European Patent Office in European Application No. 22742771.3.

* cited by examiner

$$\text{11}\begin{cases} \text{Eye Center:} & \begin{bmatrix} x_i \\ y_i \end{bmatrix} = s \cdot R_{2\times 3} \cdot \begin{bmatrix} x_e \\ y_e \\ z_e \end{bmatrix} + \begin{bmatrix} x_b \\ y_b \end{bmatrix} \end{cases}$$

$$\text{15}\begin{cases} \text{Mapping Func.:} & \begin{bmatrix} x_g \\ y_g \end{bmatrix} = F(R_{2\times 3}^{\Delta\theta} \cdot \begin{bmatrix} g \\ p \\ \vdots \end{bmatrix}) \end{cases}$$

- $(x_i, y_i)$ → eye center in image
- $(x_b, y_b)$ → bias in image
- $R_{2\times 3}$ → camera rotation matrix
- $s$ → scale factor
- $R_{2\times 3}^{\Delta\theta}$ → compensation matrix
- $g$ → glint feature
- $p$ → pupil feature

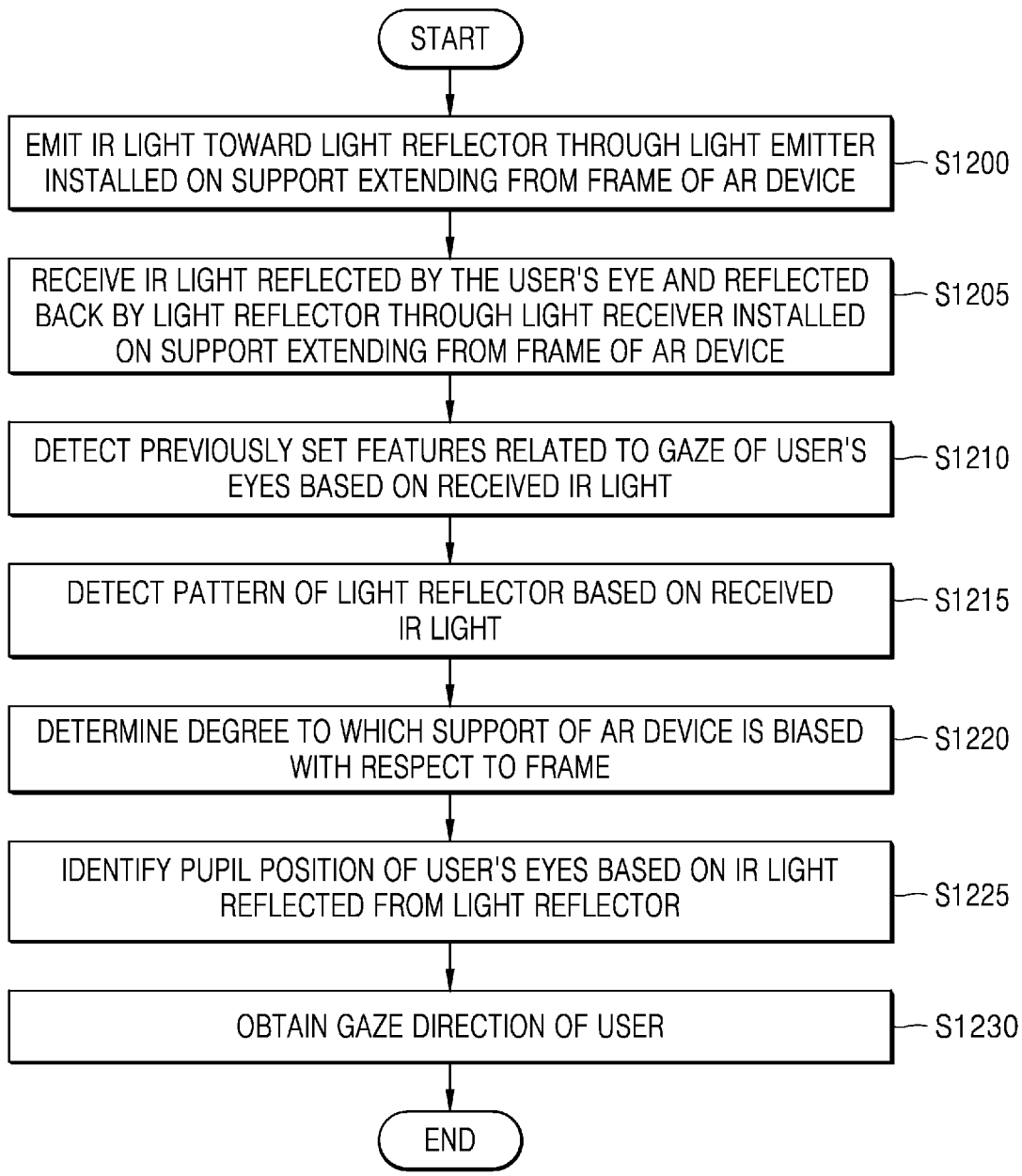

AUGMENTED REALITY DEVICE AND METHOD FOR DETECTING USER'S GAZE

CROSS-REFERENCE TO RELATED APPLICATIONS

This application is a bypass continuation of International Application No. PCT/KR2022/000682 designating the United States, filed on Jan. 13, 2022, in the Korean Intellectual Property Office and claiming priority to Korean Patent Application No. 10-2021-0008942, filed on Jan. 21, 2021, Korean Patent Application No. 10-2021-0084155, filed on Jun. 28, 2021, and Korean Patent Application No. 10-2021-0128345, filed on Sep. 28, 2021, in the Korean Intellectual Property Office, the disclosures of which are incorporated by reference herein in their entireties.

TECHNICAL FIELD

The disclosure relates to an augmented reality (AR) device and method for detecting a user's gaze, and more particularly, to an AR device for detecting a user's gaze and a method thereof by using a light emitter and a light receiver located in a support of the AR device.

BACKGROUND ART

Augmented reality (AR) is a technology that projects a virtual image onto a physical environment space of the real world or a real world object and displays the virtual image as a single image. While being worn on a user's face or head, an AR device allows the user to see a real scene and a virtual image through a glasses type device using a see-through display such as a waveguide in front of the user's eyes. As research on such an AR device is being actively conducted, various types of wearable devices have been released or are expected to be released. In the glasses type AR device of the related art, a camera is generally arranged on a rim portion surrounding a waveguide to track the user's gaze, which causes the rim portion of the AR device to be enlarged, and further, causes the user wearing the AR device to feel uncomfortable.

DESCRIPTION OF EMBODIMENTS

Technical Problem

Provided are an augmented reality (AR) device and a method capable of detecting a user's gaze by using a light reflector and a light receiver located in a support extending from a frame of the AR device.

Provided are an AR device and a method capable of detecting a user's gaze by using light reflected through a light reflector formed on a waveguide.

Provided are an AR device and a method capable of more accurately detecting a user's gaze by calculating a degree of bias of a support of the AR device based on a pattern formed on a light reflector.

Solution to Problem

According to an aspect of the disclosure, there is provided an augmented reality (AR) device including: a waveguide; a light reflector comprising a pattern; a support configured to fix the AR device to a user's face of the AR device; a light emitter and a light receiver installed on the support; and at least one processor configured to: control the light emitter to emit light toward the light reflector, identify the pattern based on the light received by the light receiver, and obtain gaze information of a user of the AR device based on the identified pattern, wherein the light emitted toward the light reflector is reflected by the light reflector and directed toward an eye of the user, and wherein the light received by the light receiver comprises light from the light directed toward the eye of the user being reflected by the eye of the user.

The support may include a temple extending from a frame around the waveguide to be positioned on an ear of the user; and a nose support extending from the frame and positioned on a nose of the user.

The light reflector may be coated on the waveguide.

The light reflector may be formed on the waveguide.

The at least one processor may be further configured to analyze the identified pattern and identify a degree of bias of the support with respect to the frame, the support extending from the frame.

The at least one processor may be further configured to: generate a mapping function for calculating a position of a gaze point of the user based on the degree of bias of the support with respect to the frame, and based on the mapping function and the degree of bias of the support with respect to the frame, obtain the gaze information of the user.

The at least one processor may be further configured to, based on the light received by the light receiver, obtain a position of one or more feature points corresponding to the eye of the user.

The at least one processor may be configured to input the position of the one or more feature points corresponding to the eye of the user and the degree of bias of the support with respect to the frame into the mapping function and calculate the position of the gaze point of the user.

The position of the one or more feature points may include a position of a pupil feature point of the eye of the user and a position of a glint feature point of the eye of the user.

The at least one processor may be further configured to: display a target point at a specific position on the waveguide in order to calibrate the mapping function, receive light reflected by the eye of the user looking at the displayed target point through the light receiver, and calibrate the mapping function based on the light reflected by the eye of the user looking at the displayed target point.

The at least one processor may be further configured to: based on the light reflected by the eye of the user looking at the displayed target point, identify the pattern of the light reflector, based on the identified pattern, identify the degree of bias of the support, and based on the light reflected by the eye of the user looking at the displayed target point, obtain a position of one or more feature points corresponding to the eye of the user looking at the displayed target point.

The at least one processor may be further configured to input a degree of bias of the temple and the position of the one or more feature points into the mapping function, and calibrate the mapping function so that a position value of the target point is output from the mapping function.

The light emitter may be an infrared light-emitting diode (IR LED), and the light receiver is an IR camera.

The light emitter may be an infrared (IR) scanner, and the light receiver is an IR detector.

The at least one processor may be further configured to: based on IR light obtained from the IR detector, obtain a position of one or more feature points corresponding to the eye of the user calibrated according to a degree of bias of the support with respect to the frame, and obtain the gaze information of the user based on the calibrated position of the one or more feature points corresponding to the eye of the user.

According to another aspect of the disclosure, there is provided a method, performed by an augmented reality (AR) device, of detecting a user's gaze, the method including: emitting, by a light emitter installed in a support of the AR device, light toward a light reflector comprising a pattern, the light emitted by the light emitter being directed toward an eye of a user wearing the AR device, receiving, by a light receiver installed on the support, the light reflected by the eye of the user, identifying the pattern based on the light received through the light receiver, and obtaining gaze information of the user based on the identified pattern.

The method may further include analyzing the identified pattern and identifying a degree of bias of the support with respect to the frame based on the identified pattern, wherein the support extends from the frame, wherein the obtaining of the gaze information may include determining a gaze direction of the user based on the degree of bias of the support with respect to the frame.

The method may further include generating a mapping function for calculating a position of a gaze point of the user based on the degree of bias of the support with respect to the frame, wherein the obtaining of the gaze information may include calculating the position of the gaze point of the user based on the mapping function and the degree of bias of the support with respect to the frame.

The method may further include, based on the light received by the light receiver, obtaining a position of one or more feature points corresponding to the eye of the user, wherein the obtaining of the gaze information comprises inputting the position of the one or more feature points corresponding to the eye of the user and the degree of bias of the support with respect to the frame into the mapping function and calculating the position of the gaze point of the user.

According to another aspect of the disclosure, there is provided a computer-readable recording medium having recorded thereon a program for executing a method including: emitting, by a light emitter installed in a support of the AR device, light toward a light reflector comprising a pattern, the light emitted by the light emitter being directed toward an eye of a user wearing the AR device; receiving, by a light receiver installed on the support, the light reflected by the eye of the user; identifying the pattern based on the light received through the light receiver; and obtaining gaze information of the user based on the identified pattern.

BRIEF DESCRIPTION OF DRAWINGS

FIG. 11 is a diagram illustrating examples of functions used by an AR device to calculate a center of an eyeball and calculate a gaze point of a user, according to an example embodiment of the disclosure.

FIG. 12 is a flowchart of a method, performed by an AR device, of detecting a user's gaze, according to an example embodiment of the disclosure.

MODE OF DISCLOSURE

Figure 1:
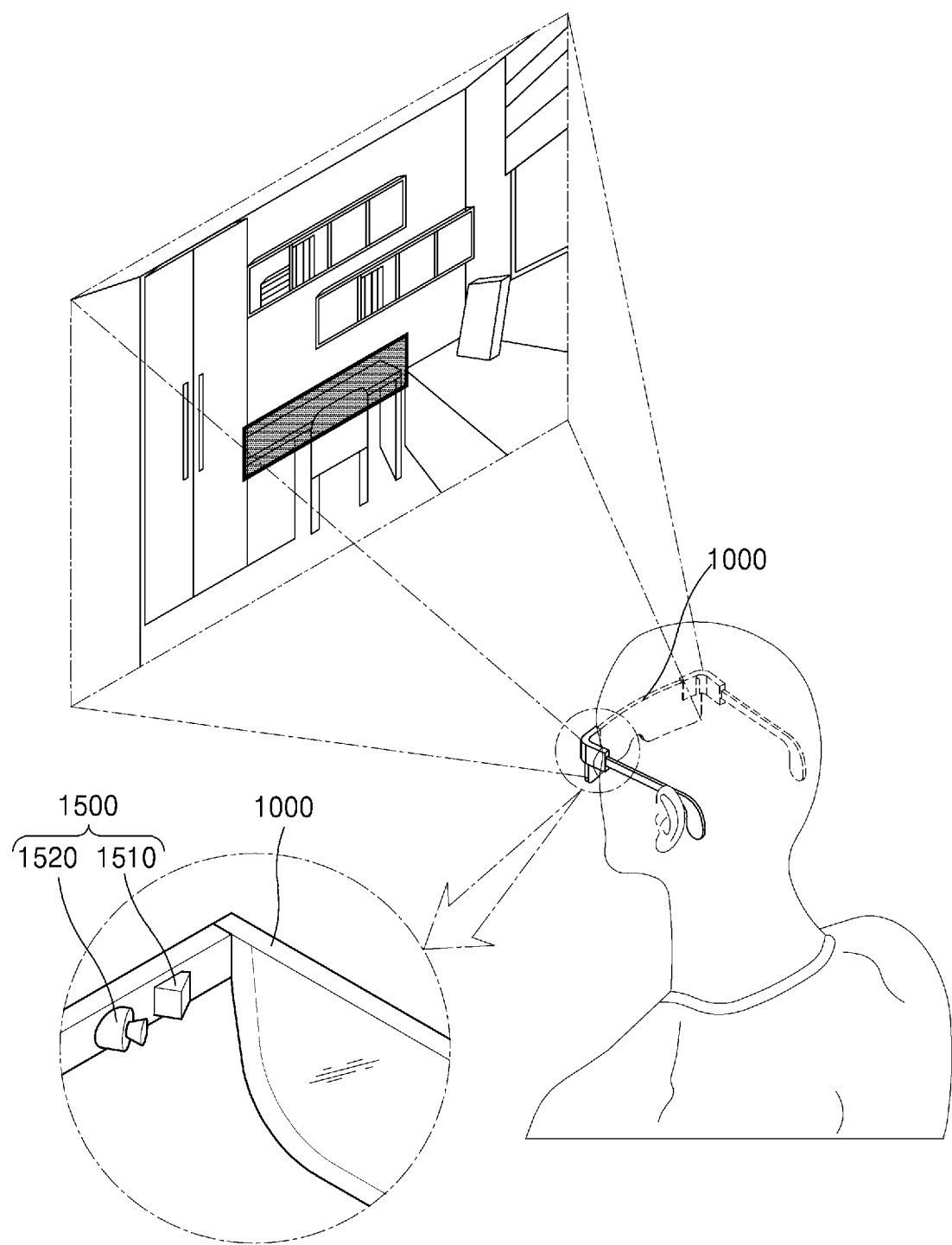
FIG. 1 is a diagram illustrating an example in which an augmented reality (AR) device detects a user's gaze using a gaze detector located in a temple portion of the AR device, according to an example embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will now be described in detail with reference to the accompanying drawings for one of skill in the art to be able to perform the disclosure without any difficulty. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the present specification.

Throughout the specification, it will be understood that when an element is referred to as being "connected to" another element, it may be "directly connected to" the other element or be "electrically connected to" the other element through an intervening element. In addition, when an element is referred to as "including" a constituent element, other constituent elements may be further included not excluded unless there is any other particular mention on it.

The term 'augmented reality (AR)' herein denotes a technology that provides viewing of a virtual image on a physical environment space of the real world or viewing of a virtual image together with a real object.

In addition, the term 'AR device' denotes a device capable of creating 'AR', and includes not only AR glasses that are typically worn on a user's face but also includes head-mounted display (HMD) apparatuses and AR helmets that are worn on the user's head, etc.

Meanwhile, the term 'real scene' denotes a scene of the real world that the user sees through the AR device, and may include a real world object. In addition, the term 'virtual image' denotes an image generated by an optical engine, and may include both a static image and a dynamic image. The virtual image may be observed with a real scene, and may be an image representing information about a real object in the real scene, information about an operation of the AR device, a control menu, etc.

Accordingly, an AR device may be equipped with an optical engine to generate a virtual image including light generated by a light source, and a waveguide formed of a transparent material to guide the virtual image generated by the optical engine to the user's eyes and allow the user to see a scene of the real world together with the virtual image. In addition, as described above, the AR device needs to be able to allow the user to observe a scene of the real world, and thus, an optical element for redirecting the path of light that basically has straightness is required in order to guide the light generated by the optical engine to the user' eyes through the waveguide. Here, the path of the light may be redirected by using reflection by, for example, a mirror, or by using diffraction by a diffractive element, for example, a diffractive optical element (DOE) or a holographic optical element (HOE), but the disclosure is not limited thereto.

Hereinafter, the disclosure will be described in detail with reference to the accompanying drawings.

FIG. 1 is a diagram illustrating an example in which an augmented reality (AR) device 1000 detects a user's gaze using a gaze detector 1500 located in a temple portion of the AR device 1000 according to an example embodiment of the disclosure.

Referring to FIG. 1, the AR device 1000 may detect the user's gaze by using a light emitter 1510 and a light receiver 1520. The light emitter 1510 and the light receiver 1520 used to detect the user's gaze may be provided in, for example, the temple portion of the AR device 1000, and the AR device 1000 may effectively identify user's eyes by using the light emitter 1510 and the light receiver 1520 provided in the temple portion. Infrared (IR) light may be emitted from the light emitter 1510 provided in the temple portion toward a waveguide of the AR device 1000, reflected by a light reflector, and received from the user's eyes through the light receiver 1520 provided in the temple portion. Also, the AR device 1000 may obtain information about the user's eyes based on the received IR light, and detect a gaze direction of the user by using the obtained information about the eyes.

The AR device 1000 denotes a device capable of creating 'AR', and may include, for example, AR glasses that are worn on a user's face, but the disclosure is not limited thereto. For example, the AR device 1000 may include a head-mounted display (HMD) apparatus and an AR helmet that are worn on the user's head, etc. In this case, a gaze detector 1500 may be provided on an inner side part of the HMD apparatus facing the side of the user's eyes in the HMD apparatus or on an inner side part of the AR helmet facing the side of the user's eyes in the AR helmet.

Figure 2:
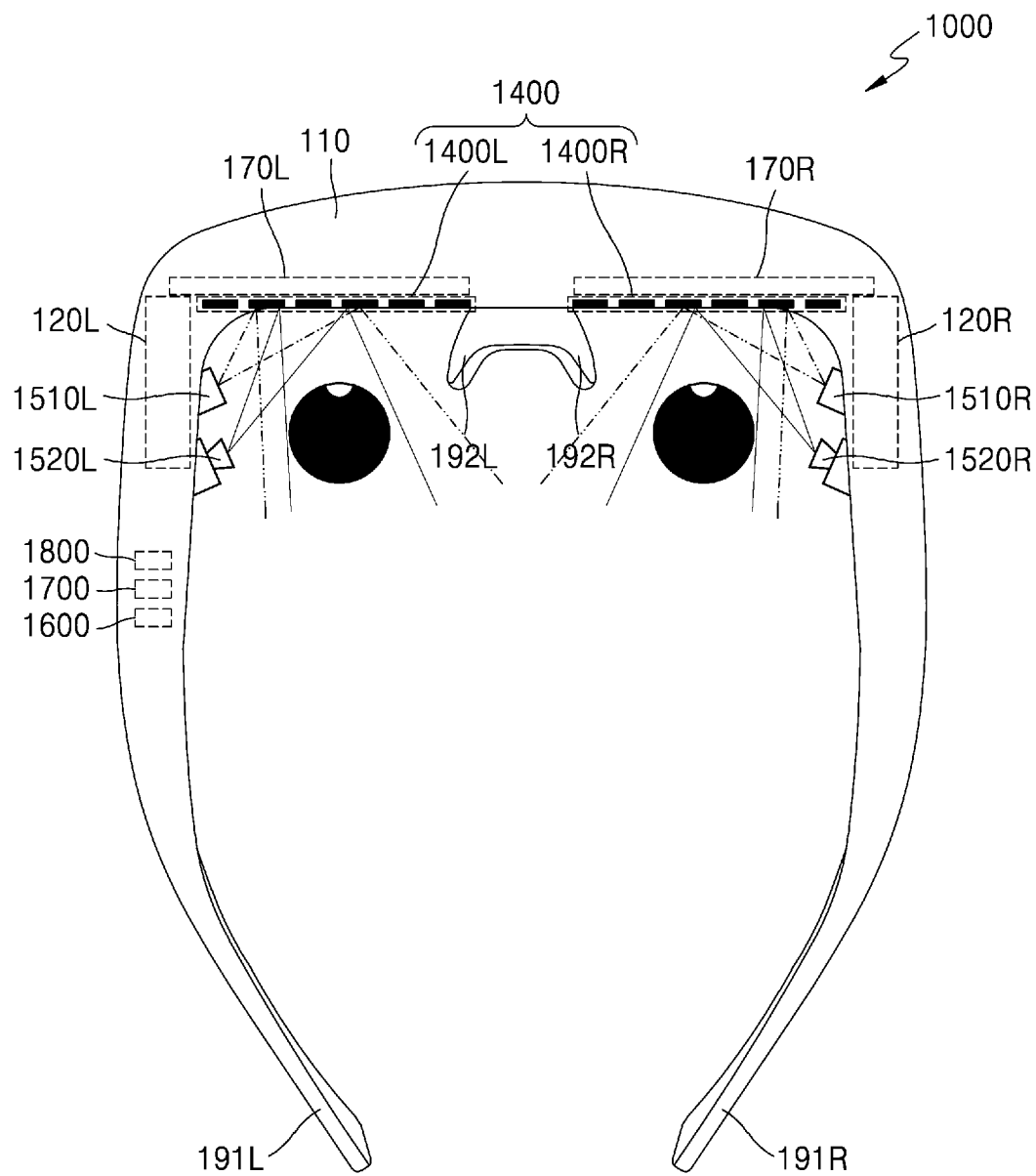
FIG. 2 is a diagram illustrating an example of an AR device according to an example embodiment of the disclosure.

FIG. 2 is a diagram illustrating an example of the AR device 1000 according to an example embodiment of the disclosure.

Referring to FIG. 2, the AR device 1000 may include a glasses-type body configured to be worn by a user as a glasses-type display device.

The glasses-type body may include a frame 110 and a support 190. The support 190 may extend from the frame 110 and be used to seat the AR device 1000 on a user's head. The support 190 may include a temple 191 and a nose support 192. The temple 191 may extend from the frame 110 and may be used to fix the AR device 1000 to the user's head on a side surface of the glasses-type body. The nose support 192 may extend from the frame 110 and may be used to seat the AR device 1000 on a user's nose, and may include, for example, a nose bridge and a nose pad, but the disclosure is not limited thereto.

Also, a waveguide 170 to which a light reflector 1400 is attached may be located on the frame 110. The frame 110 may be formed to surround an outer circumferential surface of the waveguide 170. The waveguide 170 may be configured to receive projected light in an input region and output at least part of the input light in an output region. The waveguide 170 may include a left eye waveguide 170L and a right eye waveguide 170R.

A left eye light reflector 1400L and the left eye waveguide 170L may be provided at positions corresponding to a user's left eye, and a right eye light reflector 1400R and the right eye waveguide 170R may be provided at positions corresponding to a user's right eye. For example, the left eye light reflector 1400L may be attached to the left eye waveguide 170L, or the right eye light reflector 1400R may be attached to the right eye waveguide 170R, but the disclosure is not limited thereto. In addition, for example, the left eye light reflector 1400L may be coated on the inner side of the left eye waveguide 170L to be attached to the left eye waveguide 170L, or the right eye light reflector 1400R may be coated on the inner side of the right eye waveguide 170R to be attached to the right eye waveguide 170R.

In addition, an optical engine 120 of a projector that projects display light including an image may include a left eye optical engine 120L and a right eye optical engine 120R. The eye optical engine 120L and the right eye optical engine 120R may be located on both sides of the AR device 1000. Alternatively, one optical engine 120 may be included in a central portion around the nose support 192 of the AR device 1000. Light emitted from the optical engine 120 may be displayed through the waveguide 170.

The light emitter 1510 and the light receiver 1520 of the gaze detector 1500 may be provided on an inner side part of the support 190 of the AR device 1000, which is a position between the support 190 and user's eyes. The light emitter 1510 and the light receiver 1520 may be provided to face the light reflector 1400 in the support 190 of the AR device 1000. For example, the light emitter 1510 and the light receiver 1520 may be provided at positions spaced from the frame 110 by about 10 mm to 15 mm on the inner side of the temple 191 of the AR device 1000, in order to respectively emit and receive IR light without being disturbed by user's hair, etc.

Figure 3:
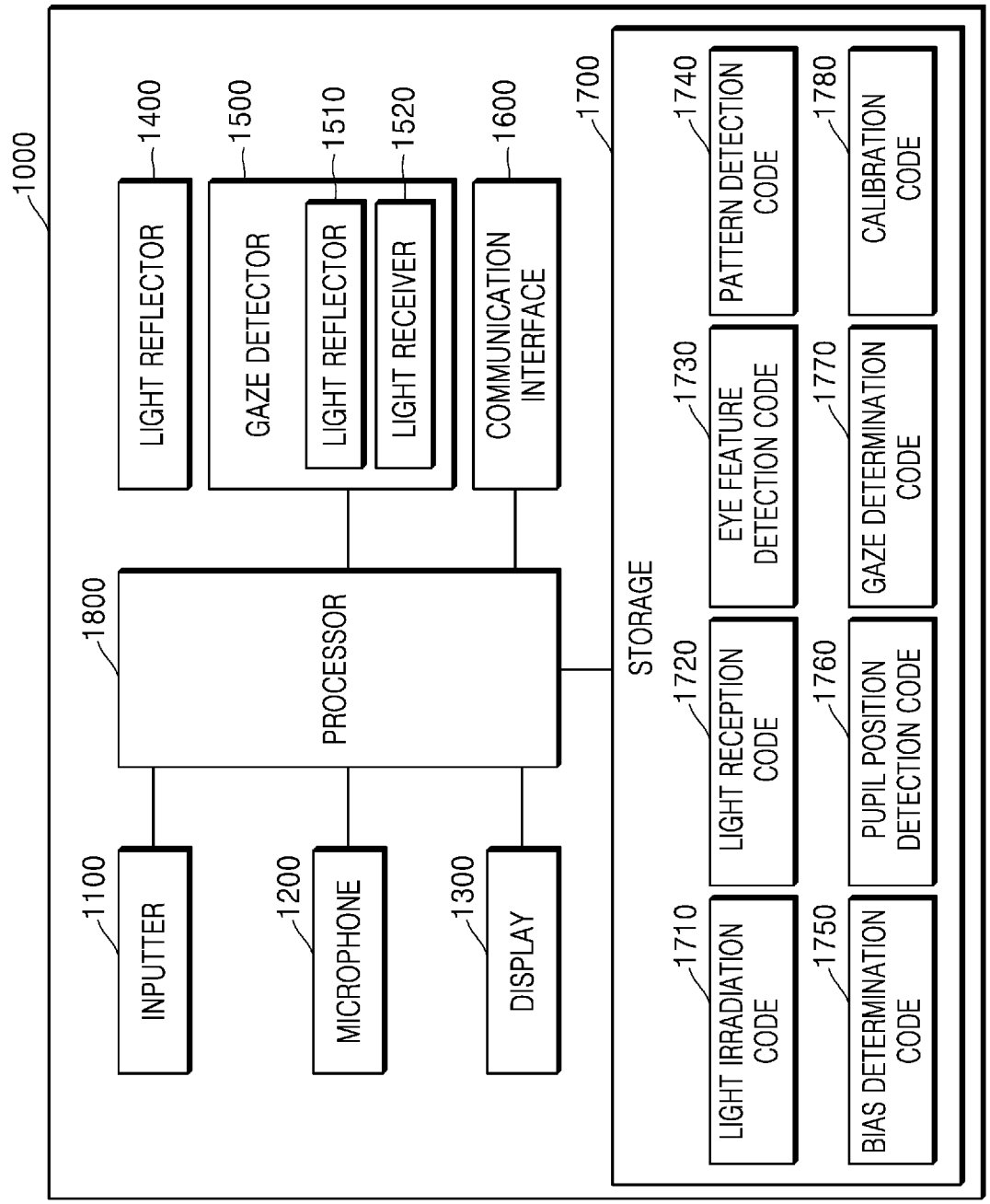
FIG. 3 is a block diagram of an AR device according to an example embodiment of the disclosure.

FIG. 3 is a block diagram of the AR device 1000 according to an example embodiment of the disclosure.

Referring to FIG. 3, the AR device 1000 according to an example embodiment of the disclosure may include a user inputter 1100, a microphone 1200, a display 1300, a light reflector 1400, a gaze detector 1500, a communication interface 1600, a storage 1700, and a processor 1800. Also, the gaze detector 1500 may include the light emitter 1510 and the light receiver 1520.

The user inputter 1100 refers to a means by which a user inputs data for controlling the AR device 1000. For example, the user inputter 1100 may include a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, but the disclosure is not limited thereto.

The microphone 1200 may receive an external audio signal, and process the received audio signal into electrical voice data. For example, the microphone 1200 may receive an audio signal from an external device or a speaker. The microphone 1200 may use various denoising algorithms for removing noise generated during a process of receiving the external audio signal. The microphone 1200 may receive a voice input of the user for controlling the AR device 1000.

The display 1300 may display information processed by the AR device 1000. For example, the display 1300 may display a user interface for capturing an image of surroundings of the AR device 1000, and information related to a service provided based on the captured image of the surroundings of the AR device 1000.

According to an example embodiment of the disclosure, the display 1300 may provide an AR image. The display 1300 according to an example embodiment of the disclosure may include the waveguide 170 and the optical engine 120. The waveguide 170 may include a transparent material through which a partial region of a rear surface is visible when the user wears the AR device 1000. The waveguide 1320 may be configured as a flat plate of a single layer or multi-layer structure including a transparent material through which light may be internally reflected and propagated. The waveguide 1320 may face an exit surface of the optical engine 120 to receive light of a virtual image projected from the optical engine 120. Here, the transparent material is a material through which light is capable of passing, its transparency may not be 100%, and may have a certain color. According to an example embodiment of the disclosure, the waveguide 170 includes the transparent material, and thus the user may view not only a virtual object of the virtual image but also an external real scene, so that the waveguide 170 may be referred to as a see-through display. The display 1300 may output the virtual object of the virtual image through the waveguide 170, thereby providing an AR image. When the AR device 1000 is a glasses type device, the display 1300 may include a left display and a right display.

The light reflector 1400 may reflect light emitted from the light emitter 1510 which will be described later. The light reflector 1400 and the waveguide 170 may be provided at positions facing the user's eyes, and may be attached to each other. For example, the light reflector 1400 may be coated on at least a partial region of the waveguide 170. In addition, the light reflector 1400 may be attached to or coated on other elements included in the glasses type AR device 1000 in addition to the waveguide 170, for example, a vision correcting lens for vision correction or a cover glass installed to protect the waveguide 170. The light reflector 1400 may include a material capable of reflecting IR light emitted from the light emitter 1510. The light reflector 1400 may be, for example, silver, gold, copper, ora material including one or more of these metals, but the disclosure is not limited thereto. Accordingly, the IR light emitted from the light emitter 1510 may be reflected by the light reflector 1400 and directed toward the user's eyes, and the IR light reflected back from the user's eyes may be reflected by the light reflector 1400 and directed toward the light receiver 1520.

The light reflector 1400 may be coated on the waveguide 170 to have a certain pattern. The pattern formed on the light reflector 1400 may include, for example, a dot pattern, a line pattern, a grid pattern, a 2D marker, etc., but the disclosure is not limited thereto. In addition, the pattern formed on the light reflector 1400 may be formed on, for example, a part of the waveguide 170 at which the user's gaze is less frequently directed. The pattern formed on the light reflector 1400 may be formed on, for example, a part of the waveguide 170 that does not interfere with capturing or scanning the user's eyes. For example, the certain pattern may indicate a pattern formed by a part in which light emitted from the light emitter 1510 is reflected and a part in which the light is not reflected, in the light reflector 1400. Because light emitted toward the part in which the light is not reflected, in the light reflector 1400 is not reflected by the light reflector 1400, the light receiver 1520 does not receive the light emitted toward the part in which the light is not reflected. Accordingly, the pattern of the light reflector 1400 formed by the part in which light is reflected and the part in which the light is not reflected may be detected from the light received by the light receiver 1520. In addition, when the light emitted from the light emitter 1510 is IR light, the certain pattern may include a material for reflecting the IR light, and the material for reflecting the IR light may not be visible to the user's eyes. Because most of a real world light or real scene observed by the user through the AR device 1000 includes visible light, the user may not be disturbed by the light reflector 1400 in which the certain pattern is formed, and may observe the real world light or real scene.

The gaze detector 1500 may include the light emitter 1510 that emits IR light for detecting the user's gaze and the light receiver 1520 that receives the IR light, and may detect data related to the user's gaze of the user who wears the AR device 1000.

The light emitter 1510 of the gaze detector 1500 may emit the IR light toward the light reflector 1400 so that the IR light reflected by the light reflector 1400 may be directed toward the user's eyes. The light emitter 1510 may emit the IR light toward the light reflector 1400, the emitted IR light may be reflected by the light reflector 1400, and the reflected IR light may be directed toward the user's eyes. The light emitter 1510 may be provided at a position in the AR device 1000 where the IR light may be emitted toward the light reflector 1400. The light emitter 1510 may be located on the support 190 of FIG. 2 that supports the AR device 1000 on the user's face, for example, like the temple 191 and the nose support 192 of FIG. 2.

In addition, the IR light reflected from the user's eyes may be reflected by the light reflector 1400 and received by the light receiver 1520 of the gaze detector 1500. The IR light directed toward the user's eyes may be reflected from the user's eyes, the IR light reflected from the user's eyes may be reflected by the light reflector 1400, and the light receiver 1520 may receive the IR light reflected by the light reflector 1400. The light receiver 1520 may be provided at a position in the AR device 1000 where the IR light reflected from the light reflector 1400 may be received. The light receiver 1520 may be located on the support 190 of FIG. 2 that supports the AR device 1000 on the user's face, for example, like the temple 191 and the nose support 192 of FIG. 2. Also, for example, the nose support 192 of FIG. 2 may include a nose bridge and a nose pad. In addition, the nose bridge and the nose pad may be integrally configured, but the disclosure is not limited thereto.

For example, the light emitter 1510 may be an IR light-emitting diode (LED) that emits IR light, and the light receiver 1520 may be an IR camera that captures IR light. In this case, the IR camera may capture the user's eyes using the IR light reflected by the light reflector 1400. When the light emitter 1510 is the IR LED and the light receiver 1520 is the IR camera, the light emitter 1510 may emit IR light of planar light toward the light reflector 1400, and the light receiver 1520 may receive the IR light of the planar light reflected from the light reflector 1400. The planar light may be light emitted in a planar form, and the planar light emitted from the light emitter 1510 may be directed toward at least a part of the entire region of the light reflector 1400. At least a part of the entire region of the light reflector 1400 may be set so that the planar light reflected from at least a part of the entire region of the light reflector 1400 may cover the user's eyes.

Alternatively, for example, the light emitter 1510 may be an IR scanner that emits IR light, and the light receiver 1520 may be an IR detector that detects IR light. In this case, the IR scanner may emit IR light so that the IR light for scanning the user's eyes is directed toward the user's eyes, and the IR detector may detect the IR light reflected from the user's eyes. When the light emitter 1510 is the IR scanner that emits IR light and the light receiver 1520 is the IR detector that detects IR light, the light emitter 1510 may emit line lights in the form of line, and the line lights emitted from the light emitter 1510 may be directed toward a part of the entire region of the light reflector 1400. At least a part of the entire region of the light reflector 1400 may be set so that the line lights reflected from at least a part of the entire region of the light reflector 1400 may cover the user's eyes. When the light emitter 1510 is the IR scanner that emits IR light and the light receiver 1520 is the IR detector that detects IR light, the light emitter 1510 may emit point lights in the form of point, and the point lights emitted from the light emitter 1510 may be directed toward a part of the entire region of the light reflector 1400. At least a part of the entire region of the light reflector 1400 may be set so that the point lights reflected from at least a part of the entire region of the light reflector 1400 may cover the user's eyes.

When the light emitter 1510 is the IR scanner and the light receiver 1520 is the IR detector, the light emitter 151 may emit IR light of the point light or the line light to the light reflector 1400, and the light receiver 1520 may receive the IR light of the point light or the linear light reflected from the light reflector 1400. In this case, the light emitter 1510 may sequentially emit IR light while moving a light emitting direction of the light emitter 1510 so that the IR light of the point light or the line light may cover a space where the user's eyes are located. Although the IR scanner generally includes the IR LED and a micro-electro mechanical systems (MEMS) mirror capable of controlling a direction of the IR light emitted from the IR LED and reflecting the IR light, hereinafter, the IR scanner, the IR LED and the MEMS mirror are collectively referred to as and described as an IR scanner. In addition, although the IR detector generally includes several photodiodes installed in a part where light detection is required, hereinafter, the IR detector and photodiodes are described as the IR detector.

When the AR device 1000 is a glasses type device, the light emitter 1510 and the light receiver 1520 may be provided on the temple 191 of the AR device 1000. For example, referring to FIG. 2, the light emitter 1510 and the light receiver 1520 may be provided on an inner side part of the temple 191 of the AR device 1000, which is a position between the temple 191 and user's eyes. For example, referring to FIG. 2, the light emitter 1510 and the light receiver 1520 may be provided at positions spaced from the frame 110 by about 10 mm to 15 mm on the inner side of the temple 191 of the AR device 1000 The light emitter 1510 and the light receiver 1520 may be provided to face the light reflector 1400 in the temple 191 of the AR device 1000.

Also, for example, referring to FIG. 2, the light emitter 1510 and the light receiver 1520 may be provided on the nose support 192 of the AR device 1000. The light emitter 1510 and the light receiver 1520 may be provided on an inner side part of the nose support 192 of the AR device 1000, which is a position between the nose support 192 and the user's eyes. For example, referring to FIG. 2, the light emitter 1510 and the light receiver 1520 may be provided at positions spaced from the frame 110 by about 10 mm to 15 mm on an inner side of the nose support 192 of the AR device 1000. The light emitter 1510 and the light receiver 1520 may be provided to face the light reflector 1400 in the nose support 192 of the AR device 1000.

The gaze detector 1500 may provide data related to the gaze of the user's eyes to the processor 1800, and the processor 1800 may obtain gaze information of the user based on the data related to the gaze of the user's eyes. The data related to the gaze of the user's eyes is data obtained by the gaze detector 1500, and may include a type (e.g., point light, line light, or planar light) of IR light emitted from the light emitter 1510, characteristics of the IR light emitted from the light emitter 1510, data regarding an emission region of the IR light emitted from the light emitter 1510, and data indicating the characteristics of the IR light received from the light receiver 1520. Further, the gaze information of the user is information related to the user's gaze, may be generated by analyzing the data related to the gaze of the user's eyes, and may include information about, for example, a location of the user's pupil, a location of a pupil central point, a location of the user's iris, a center of the user's eyes, a location of glint feature point of the user's eyes, a gaze point of the user, a gaze direction of the user, etc. but the disclosure is not limited thereto. The gaze direction of the user may be, for example, a direction of eth user's gaze from the center of the user's eyes toward the gaze point at which the user gazes. For example, the gaze direction of the user may be represented by a vector value from the center of the user's left eye toward the gaze point and a vector value from the center of the user's right eye toward the gaze point, but the disclosure is not limited thereto. According to an example embodiment of the disclosure, the gaze detector 1500 may detect data related to the gaze of the user wearing the AR device 1000 at a previously determined time interval.

The communication interface 1600 may transmit/receive data for receiving a service related to the AR device 1000 to/from an external device and a server.

The storage 1700 may store a program to be executed by the processor 1800, which will be described later, and may store data input to or output from the AR device 1000.

The storage 1700 may include at least one of an internal memory or an external memory. The internal memory may include, for example, at least one of a volatile memory (e.g., dynamic RAM (DRAM), static RAM (SRAM), synchronous dynamic RAM (SDRAM), etc.), a non-volatile memory (e.g., one time programmable ROM (OTPROM), programmable ROM (PROM), erasable and programmable ROM (EPROM), electrically erasable and programmable ROM (EEPROM), mask ROM, flash ROM, etc.), hard disk drive (HDD), or solid state drive (SSD). According to an example embodiment of the disclosure, the processor 1800 may load a command or data received from at least one of the non-volatile memory or another element into the volatile memory and process the command or the data. Also, the processor 1800 may store data received or generated from another element in the non-volatile memory. The external memory may include, for example, at least one of compact flash (CF), secure digital (SD), micro secure digital (Micro-SD), mini secure digital (Mini-SD), extreme digital (xD), or memory stick.

Programs stored in the storage 1700 may be classified into a plurality of modules according to their functions. According to an example embodiment, each of the plurality of modules may include one or more computer readable codes, which may include, for example, a light irradiation code 1710, a light reception code 1720, an eye feature detection code 1730, a pattern detection code 1740, a bias determination code 1750, a pupil position detection code 1760, a gaze determination code 1770, and a calibration code 1780. For example, a memory may be included in the gaze detector 1500, and, in this case, the light irradiation code 1710 and the light reception code 1720 may be stored as firmware in the memory included in the gaze detector 1500.

The processor 1800 controls the overall operation of the AR device 1000. For example, the processor 1800 may execute the programs stored in the storage 1700, thereby generally controlling the user inputter 1100, the microphone 1200, the display 1300, the light reflector 1400, the gaze detector 1500, the communication interface 1600, the storage 1700, etc.

The processor 1800 may execute the light irradiation code 1710, the light reception code 1720, the eye feature detection code 1730, the pattern detection code 1740, the bias determination code 1750, the pupil position detection code 1760, the gaze determination code 1770, and the calibration code 1780 that are stored in the storage 1700, thereby determining the gaze point of the user and the gaze direction.

According to an example embodiment of the disclosure, the AR device 1000 may include a plurality of processors 1800, and the light irradiation code 1710, the light reception code 1720, the eye feature detection code 1730, the pattern detection code 1740, the bias determination code 1750, the pupil position detection code 1760, the gaze determination code 1770, and the calibration code 1780 may be executed by the plurality of processors 1800.

For example, some of the light irradiation code 1710, the light reception code 1720, the eye feature detection code 1730, the pattern detection code 1740, the bias determination code 1750, the pupil position detection code 1760, the gaze determination code 1770, and the calibration code 1780 may be executed by a first processor, and the others of the light irradiation code 1710, the light reception code 1720, the eye feature detection code 1730, the pattern detection code 1740, the bias determination code 1750, the pupil position detection code 1760, the gaze determination code 1770, and the calibration code 1780 may be executed by a second processor, but the disclosure is not limited thereto.

For example, the gaze detector 1500 may include another processor and a memory, and the other processor may execute the light irradiation code 1710 and the light reception code 1720 that are stored in the memory, and the processor 1800 may execute the eye feature detection code 1730, the pattern detection code 1740, the bias determination code 1750, the pupil position detection code 1760, the gaze determination code 1770, and the calibration code 1780 that are stored in the storage 1700.

The processor 1800 may execute the light irradiation code 1710 stored in the storage 1700 so that the light emitter 1510 may emit IR light toward the light reflector 1400. The processor 1800 may control the light emitter 1510 by executing the light irradiation code 1710, and the light emitter 1510 controlled by the processor 1800 may emit the IR light toward at least a partial region of the light reflector 1400 so that the IR light reflected by the light reflector 1400 may cover the user's eyes.

For example, when the light receiver 1520 is an IR camera, the light emitter 1510 may be an IR LED, and the processor 1800 may control the IR LED so that the IR light emitted from the IR LED may be reflected by the light reflector 1400 and irradiated to a region including the user's eyes, in order for the IR camera to capture the user's eyes. For example, in order to reflect the light emitted from the IR LED by using the light reflector 1400 and irradiate the light to the region including the user's eyes, the processor 1800 may control an irradiation direction of the IR light emitted from the IR LED, and apply power to the IR LED, thereby controlling emission of the IR light from the IR LED.

According to one example embodiment of the disclosure, the IR camera and the IR LED may be installed toward the light reflector 1400 of the AR device 1000 so that the IR camera may capture the entire region of the user's eyes, and the processor 1800 may control the IR LED installed toward the light reflector 1400 to emit the IR light. An example in which the irradiation direction of the IR light emitted from the IR LED is controlled will be described in more detail with reference to FIG. 5A.

According to another example embodiment of the disclosure, when the light receiver 1520 is an IR detector, the light emitter 1510 may be an IR scanner, and the processor 1800 may control the IR scanner to scan the user's eyes by reflecting the IR light emitted from the IR scanner by using the light reflector 1400, so that the IR detector may detect the user's eyes. For example, in order to scan the user's eyes by reflecting the light emitted from the IR scanner by using the light reflector 1400, the processor 1800 may control an irradiation direction of the IR light emitted from the IR scanner, and apply power to the IR scanner, thereby controlling emission of the IR light from the IR scanner. An example in which the irradiation direction of the IR light emitted from the IR scanner is controlled will be described in more detail with reference to FIGS. 5B and 5C.

The processor 1800 may execute the light reception code 1720 stored in the storage 1700 so that the light receiver 1520 may receive the light reflected by the light reflector 1400 from the user's eyes. The processor 1800 may control the light receiver 1520 by executing the light reception code 1720, and the light receiver 1520 controlled by the processor 1800 may receive the light reflected by the light reflector 1400 from the user's eyes.

For example, when the light emitter 1510 is an IR LED, the light receiver 1520 may be an IR camera, and the processor 1800 may control the IR camera to capture the user's eyes through the light reflected by the light reflector 1400 from the user's eyes.

Alternatively, for example, when the light emitter 1510 is an IR scanner, the light receiver 1520 may be an IR detector, and the processor 1800 may control the IR detector to detect the IR light reflected by the light reflector 1400 from the user's eyes, so that the IR detector may detect the user's eyes.

The processor 1800 may execute the eye feature detection code 1730 stored in the storage 1700, thereby detecting features related to the gaze of the user's eyes. For example, the processor 1800 may execute the eye feature detection code 1730, thereby detecting a position of a pupil feature point of the user's eyes and a position of a glint feature point of the user's eyes. The pupil feature point may be, for example, a pupil central point, and the glint feature point of the eyes may be a part having brightness greater than or equal to a certain value in a detected eye region. The position of the pupil feature point and the position of the glint feature point of the eyes may be identified, for example, by a coordinate value indicating a position in a coordinate system of the light receiver 1520. For example, the coordinate system of the light receiver 1520 may be a coordinate system of an IR camera or a coordinate system of the IR detector, and the coordinate value in the coordinate system of the light receiver 1520 may be a 2D coordinate value.

The processor 1800 may detect features related to the gaze of the eyes by analyzing the light received by the light receiver 1520. For example, when the light receiver 1520 is an IR camera, the processor 1800 may identify the position of the pupil feature point and the position of the glint feature point of the eyes in an image captured by the IR camera. Alternatively, for example, when the light receiver 1520 is an IR detector, the processor 1800 may analyze the IR light detected by the IR detector, thereby identifying the position of the pupil feature point and the position of the glint feature point of the eyes. When the positions of the feature points are identified based on the IR light detected by the IR detector, the position of the pupil feature point and the position of the glint feature point may have values calibrated by reflecting the bias of the support 190. The position of the pupil feature point and the position of the glint feature point calibrated by reflecting the bias of the support 190 will be described in more detail with reference to FIG. 11.

Also, the processor 1800 may analyze the light received by the light receiver 1520, thereby obtaining a coordinate value indicating the position of the pupil feature point and a coordinate value indicating the position of the glint feature point of the eyes. For example, when the light receiver 1520 is an IR camera, the processor 1800 may obtain the coordinate value of the pupil feature point and the coordinate value of the glint feature point of the eyes from the coordinate system of the IR camera. The coordinate system of the IR camera may be used to indicate the position of the pupil feature point and the position of the glint feature point of the eyes, and, for example, coordinate values corresponding to pixels of an image captured by the IR camera on the coordinate system of the IR camera may be previously set. Also, based on a property (e.g., brightness) of IR light received through the IR camera, a coordinate value corresponding to a feature point of the eyes may be identified.

For example, when the light receiver 1520 is an IR camera, the processor 1800 may identify the position of the pupil central point in the image captured by the IR camera. The processor 1800 may identify the brightness of IR light received through an image sensor of the IR camera including a plurality of photodiodes, and identify at least one pixel that receives IR light indicating the pupil among the pixels of the image captured by the IR camera, thereby identifying the position of the pupil central point. For example, positions of the pixels in the image captured by an IR camera may be identified through the coordinate system of the IR camera, and the position of the pupil central point may have a coordinate value in the coordinate system of the IR camera, as a position value of at least one pixel corresponding to the pupil central point.

For example, the processor 1800 may identify a position of the brightest point in the image captured by the IR camera, in order to identify the glint feature point of the eyes. The processor 1800 may identify the brightness of the IR light received through the image sensor of the IR camera including the plurality of photodiodes, and may identify at least one pixel corresponding to bright IR light equal to or greater than a certain reference among the pixels of the image captured by the IR camera, thereby identifying the position of the glint feature point of the eyes. For example, the processor 1800 may identify the pixel corresponding to the brightest IR light among the pixels of the image captured by the IR camera, thereby identifying the position of the glint feature point of the eyes. For example, the positions of the pixels in the image captured by the IR camera may be identified through the coordinate system of the IR camera, and the position of the glint feature point of the eyes may have the coordinate value in the coordinate system of the IR camera, as a position value of the pixel corresponding to the glint feature point.

Alternatively, for example, when the light receiver 1520 is an IR detector, the processor 1800 may calculate the coordinate value of the pupil feature point and the coordinate value of the glint feature point of the eyes in the coordinate system of the IR detector.

When the light emitter 1510 is an IR scanner, the processor 1800 may control the IR scanner to sequentially irradiate a point light source or a line light source to cover a region where the user's eyes are located, and sequentially receive the light reflected from the user's eyes through the IR detector in order to scan the region where the user's eyes are located. In addition, the processor 1800 may analyze an array of light sequentially received through the IR detector, thereby identifying the pupil feature point and the glint feature point of the eyes.

The coordinate system of the IR detector may be used to indicate the position of the pupil feature point of the pupil and the position of the glint feature point of the eyes, and, for example, coordinate values corresponding to the lights in the array of lights sequentially received through the IR detector on the coordinate system of the IR detector may be previously set. For example, irradiation directions and irradiation times of lights emitted from the IR scanner may be determined according to an operation setting value of the IR scanner, and a light array may be formed from the lights emitted from the IR scanner. For example, based on the irradiation direction and irradiation time of the lights emitted from the IR scanner, and reception time of the lights received from the IR detector, coordinate values corresponding to the lights in the light array on the coordinate system of the IR detector may be identified. In addition, based on the property (e.g., brightness) of the lights in the array of lights sequentially received through the IR detector, light corresponding to the feature point of the eye and coordinate values of the light may be identified.

For example, the processor 1800 may identify lights having a brightness equal to or less than a certain value in the received light array, thereby identifying the position of the pupil feature point based on coordinate values corresponding to the identified lights on the coordinate system of the IR detector.

For example, the processor 1800 may identify light having a brightness equal to or greater than a certain value in the received light array, thereby identifying a coordinate value corresponding to the identified light on the coordinate system of the IR detector as the coordinate value of the glint feature point of the eyes.

Also, for example, when the light receiver 1520 is an IR detector, the coordinate value of the pupil feature point and the coordinate value of the glint feature point of the eyes may be values calibrated by reflecting the degree of bias of the support 190 of the AR device 1000, which will be described below. In this case, the processor 1800 may calculate the coordinate value of the pupil feature point and the coordinate value of the glint feature point of the eyes calibrated by reflecting the degree of bias of the temple 191 of the AR device 1000 and/or the degree of bias of the nose support 192. The calibrated coordinate values may be input to a mapping function which will be described below.

The processor 1800 may execute the pattern detection code 1740 stored in the storage 1700, thereby detecting a pattern of the light reflector 1400. The light reflector 1400 may be coated on one surface of the waveguide 170 of the AR device 1000 to have a certain pattern. The processor 1800 may receive the IR light reflected by the user's eyes and reflected by the light reflector 1400 through the light receiver 1520, and identify a shape of the pattern based on the received IR light. The pattern formed on the light reflector 1400 may include, for example, a dot pattern, a line pattern, a grid pattern, a 2D marker, etc., but the disclosure is not limited thereto. An example of the pattern formed on the light reflector 1400 and identified by the pattern detection code 1740 will be described in more detail with reference to FIGS. 7A to 7D. When the temple 191 is biased with respect to the frame 110, the pattern identified by the pattern detection code 1740 may have a deformed shape.

For example, when the light receiver 1520 is an IR camera, the IR camera may capture the user's eyes based on the IR light reflected by the light reflector 1400, and the processor 1800 may identify a pattern within an image obtained by capturing the user's eyes from the image.

For example, when the light receiver 1520 is an IR detector, the IR detector may sequentially receive IR lights reflected by the light reflector 1400, and the processor 1800 may identify a part related to the pattern of the light reflector 1400 in an array of the sequentially received IR lights.

The processor 1800 may execute the bias determination code 1750 stored in the storage 1700, thereby determining a degree to which the support 190 of the AR device 1000 is biased with respect to the frame 110. The support 190 may include, for example, the temple 191 and the nose support 192. When the user wears the AR device 1000, the temple 191 may be widened or narrowed according to the size of the user's head and face. At this time, when the IR light is received after the support 190 is biased with respect to the frame 110, the bias determination code 1750 may identify a pattern having a deformed shape from the received IR light. Also, the bias determination code 1750 may compare the pattern having the deformed shape with a non-deformed pattern, thereby estimating the degree of bias of the support 190. For example, the bias determination code 1750 may compare the pattern having the deformed shape with the non-deformed pattern to identify degree of deformation of the pattern, and may determine degree of bias of the support 190 based on the degree of deformation of the pattern. Alternatively, the bias determination code 1750 may analyze only the pattern having the deformed shape without comparing the pattern having the deformed shape with the non-deformed pattern, thereby estimating the degree of bias of the support 190. For example, when the pattern is a dot pattern, the bias determination code 1750 may identify a difference between intervals between points in the pattern having the deformed shape, thereby estimating the degree of bias of the support 190.

For example, the degree of bias of the temple 191 may be expressed as a bias angle indicating a difference between a default angle of the temple 191 with respect to the frame 110 and an angle of the biased temple 191 with respect to the frame 110, but the disclosure is not limited thereto. Also, for example, the degree of bias of the nose support 192 may be expressed as a bias angle indicating a difference between a default angle of the nose support 192 with respect to the frame 110 and an angle of the biased nose support 192 with respect to the frame 110, but the disclosure is not limited thereto.

In the above, it has been described that the pattern detection code 1740 detects the deformation of the pattern formed on the light reflector 1400, and the bias determination code 1750 analyzes the pattern having the deformed shape to estimate the degree of bias of the support 190, but the disclosure is not limited thereto.

For example, a certain pattern may be formed on a part of the AR device 1000 that may reflect light emitted from the light emitter 1510 to direct the reflected light toward the light receiver 1520. For example, the pattern may be formed on a partial region of the frame 110 of the AR device 1000 directed toward the light emitter 1510 and the light receiver 1520. For example, the pattern may be formed by forming a certain curve in a partial region of the frame 110. Alternatively, for example, the pattern may be formed by forming a material capable of reflecting light on a partial region of the frame 110. In addition, the pattern may be attached to or coated on other elements included in the glasses type AR device 1000, for example, a vision correcting lens for vision correction or a cover glass installed to protect a waveguide.

Alternatively, for example, the pattern may be formed on a partial region of the nose support 192 of the AR device 1000 directed toward the light emitter 1510 and the light receiver 1520. For example, the pattern may be formed by forming a certain curve in a partial region of the nose support 192. Alternatively, for example, the pattern may be formed by forming a material capable of reflecting light on a partial region of the nose support 192. In this case, the light emitter 1510 and the light receiver 1520 are preferably located in the temple 191 of the AR device 1000, but the disclosure is not limited thereto.

Alternatively, for example, the pattern may be formed in a partial region of the temple 191 of the AR device 1000 directed toward the light emitter 1510 and the light receiver 1520. For example, the pattern may be formed by forming a certain curve in a partial region of the temple 191. Alternatively, for example, the pattern may be formed by forming a material capable of reflecting light on a partial region of the temple 191. In this case, the light emitter 1510 and the light receiver 1520 are preferably located on the nose support 192 of the AR device 1000, but the disclosure is not limited thereto.

The processor 1800 may execute the pupil position detection code 1760 stored in the storage 1700, thereby detecting a pupil position of the user's eyes. The pupil position detection code 1760 may identify the pupil position of the user's eyes based on the IR light reflected from the light reflector 1400.

For example, when the light receiver 1520 is an IR camera, the pupil position detection code 1760 may identify the pupil position of the user's eyes within an image captured by the IR camera from the image. Alternatively, for example, when the light receiver 1520 is an IR detector, the pupil position detection code 1760 may analyze the IR light sequentially obtained by the IR detector, thereby calculating the pupil position of the user's eyes.

The pupil position detection code 1760 may identify the pupil central point of the user's eyes, thereby identifying the pupil position of the user's eyes.

The processor 1800 may execute the gaze determination code 1770 stored in the storage 1700, thereby obtaining information about the user's gaze. The processor 1800 may execute the gaze determination code 1770, thereby calculating a position of the center of the user's eyes. The center of the user's eyes may be the center of user's eyeballs. The processor 1800 may calculate the position of the center of the user's eyes, based on the pupil position of the user's eyes obtained by the pupil position detection code 1760 and the degree of bias of the support 190 obtained by the bias determination code 1750. For example, the processor 1800 may calculate the position of the center of the user's eyes so that a value calculated based on a matrix for calibrating the degree of bias of the support 190, a value indicating the position of the center of the user's eyes and a bias of axis of the image obtained by capturing the user's eyes can be a value of the pupil position of the user's eyes obtained by the pupil position detection code 1760. For example, the center of the eye may be the center of the eyeball, and the position of the center of the user's eyes may have a 3D coordinate value in a coordinate system of a real space.

The processor 1800 may execute the gaze determination code 1770, thereby calculating a position of the gaze point of the user. In order to calculate the position of the gaze point of the user, the processor 1800 may previously generate a mapping function for calculating the position of the gaze point from features of the user's eyes. The mapping function is a function for calculating the position of the gaze point of the user in consideration of features of the user's eyes and bias information of the support 190, and may be generated during a calibration process of the calibration code 1780 which will be described below. For example, the position of the gaze point may have a 3D coordinate value in the coordinate system in the real space, but the disclosure is not limited thereto. For example, the position of the gaze point may have a coordinate value in the coordinate system of the waveguide 170, but the disclosure is not limited thereto.

The processor 1800 may execute the gaze determination code 1770, thereby calibrating the features related to the user's gaze obtained from the eye feature detection code 1730 based on the degree of bias obtained from the bias determination code 1750. Also, the processor 1800 may apply the features related to the user's gaze calibrated based on the degree of bias to the mapping function, thereby calculating the position of the gaze point of the user. Also, a gaze direction of the user may be determined based on the position of the central point of the user's eyes and the gaze point of the user calculated by the gaze determination code 1770. A method of obtaining the gaze direction of the user by using the gaze determination code 1770 will be described in more detail with reference to FIG. 11.

Alternatively, the processor 1800 may calculate the gaze point of the user without using the above-described mapping function. For example, when the light receiver 1520 is an IR camera, the gaze determination code 1770 may calculate the gaze direction of the user's eyes from the image obtained by capturing the user's eyes by using a certain algorithm. In this case, the obtained gaze direction may be a vector value indicating the gaze direction of the user's eyes in the camera coordinate system. The algorithm used to obtain the gaze direction of the user's eyes may be an algorithm for fitting a 3D eye model. The algorithm for fitting the 3D eye model may be an algorithm for obtaining a vector value indicating the gaze direction of the user by comparing an eye image corresponding to a reference vector value indicating the gaze direction of the user with an image captured by an IR camera In addition, the gaze determination code 1770 may convert the vector value indicating the gaze direction in the camera coordinate system into a vector value indicating the gaze direction in the coordinate system of the waveguide170 by using the bias angle of the temple 191. Thereafter, the gaze determination code 1770 may calculate an intersection point between a vector indicating the gaze direction in the coordinate system of the waveguide 170 and the waveguide 170, thereby obtaining the gaze point of the user.

The processor 1800 may execute the calibration code 1780 stored in the storage 1700, thereby calibrating the mapping function based on the bias angle of the support 190. The processor 1800 may execute the calibration code 1780, thereby calibrating the mapping function to obtain the gaze point of the user based on a previously set default bias angle and features of eyes.

For example, when the light receiver 1520 is an IR camera, the processor 1800 may display a target point for calibration through the waveguide170, and capture the user's eyes looking at the target point by using the IR camera. In addition, the processor 1800 may identify and analyze a pattern within the image obtained by capturing the user's eyes, thereby obtaining a bias angle of the support 190. In addition, the processor 1800 may detect positions of the feature points related to the user's eyes from the image obtained by capturing the user's eyes, and input the positions of the feature points of the user's eyes and the bias angle of the support 190 into the mapping function. The processor 1800 may calibrate the mapping function so that a position value of the target point may be output from the mapping function to which the positions of the feature points of the user's eyes and the bias angle of the support 190 are input.

For example, when the light receiver 1520 is an IR detector, the processor 1800 may display the target point for calibration through the waveguide170 and control the IR scanner to emit IR light for scanning the user's eyes looking at the target point. In addition, the processor 1800 may receive and analyze IR light reflected from the user's eyes through the IR detector, identify a pattern of the light reflector 1400, and estimate the bias angle of the temple 191. The processor 1800 may analyze the IR light based on the bias angle of the temple 191, thereby identifying positions of the calibrated feature points of eyes. For example, when the processor 1800 estimates the positions of the feature points of eyes by using the IR scanner and the IR detector, because results of estimating the positions of the feature points of eyes are affected by an operating angle of the IR scanner, the positions of the feature points of eyes may be calibrated based on the bias of the support 190 by calculating a value obtained by subtracting the bias angle of the support 190 from the operating angle of the IR scanner.

In addition, the processor 1800 may input the positions of the calibrated feature points of the eyes into the mapping function, and calibrate the mapping function so that the position value of the target point may be output from the mapping function in which the calibrated positions of the feature points of the eyes are input.

Figure 4:
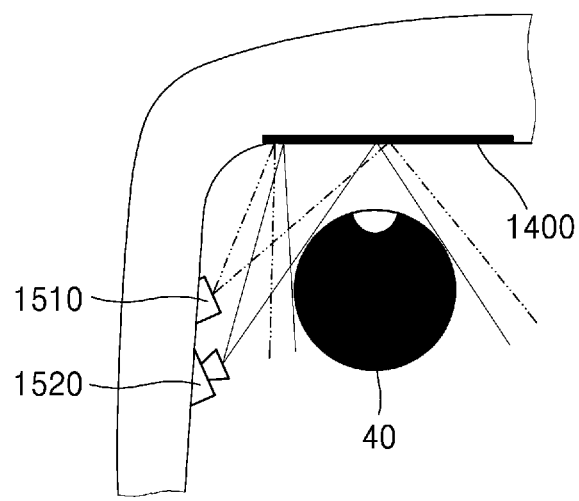
FIG. 4 is a diagram illustrating an example of operations of a light emitter and a light receiver of an AR device, according to an example embodiment of the disclosure.

FIG. 4 is a diagram illustrating an example of operations of the light emitter 1510 and the light receiver 1520 of the AR device 1000 according to an example embodiment of the disclosure.

Referring to FIG. 4, the light emitter 1510 may emit IR light toward the light reflector 1400, and the emitted IR light may be reflected by the light reflector 1400 and directed toward user's eyes. In addition, the IR light directed toward the user's eyes may be reflected back by the user's eyes and directed toward the light reflector 1400, and the IR light reflected by the user's eyes may be reflected back by the light reflector 1400 and directed toward the light receiver 1520. Also, the light receiver 1520 may receive IR light reflected from the user's eyes by the light reflector 1400 and directed toward the light receiver 1520.

In FIG. 4, for convenience of explanation, it has been described that the AR device 1000 which is a glasses type display device emits IR light toward the user's left eye and receives reflected IR light from the user's left eye, but the disclosure is not limited thereto. The AR device 1000 may emit IR light toward the user's right eye and receive the reflected IR light from the user's right eye in the same manner as shown in FIG. 4.

Figure 5A:
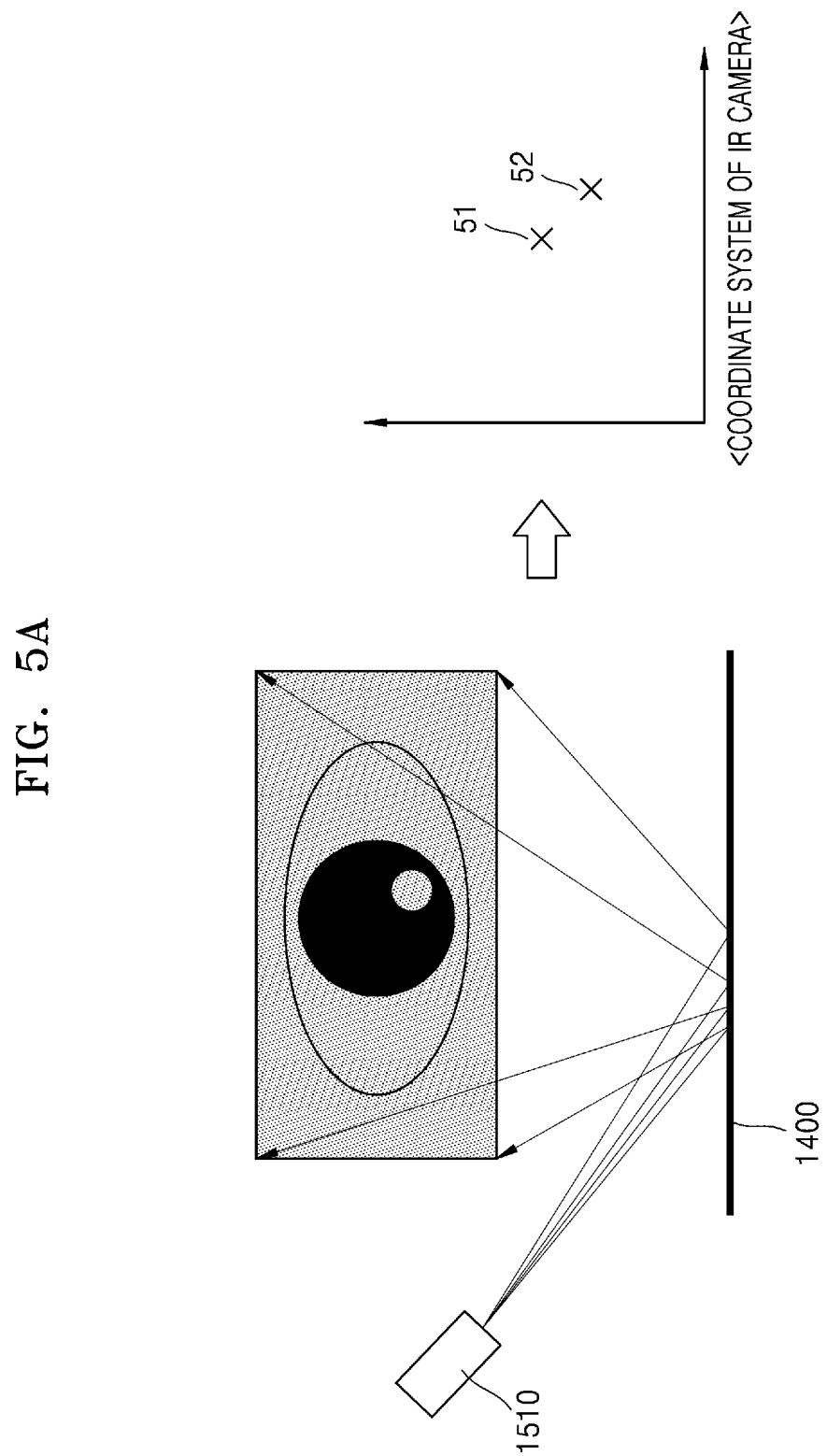
FIG. 5A is a diagram illustrating an example of a light emitter that emits planar light, according to an example embodiment of the disclosure.

FIG. 5A is a diagram illustrating an example of the light emitter 1510 that emits planar light according to an example embodiment of the disclosure.

Referring to FIG. 5A, the light emitter 1510 of FIG. 2 may be an IR LED, and the light receiver 1520 of FIG. 2 may be an IR camera. In this case, the light emitter 1510 may emit IR light of the planar light toward the light reflector 1400, and the emitted IR light may be reflected by the light reflector 1400 and directed toward a user's eye. For example, in order to reflect the light emitted from the IR LED by using the light reflector 1400 and irradiate the light to the region including the user's eye, the processor 1800 may control an irradiation direction of the IR light emitted from the IR LED, and apply power to the IR LED, thereby controlling emission of the IR light from the IR LED. In addition, the IR light of the planar light reflected by the light reflector 1400 may cover the entire user's eye. In this case, the light receiver 1520 may be an IR camera, and the IR camera may receive the IR light reflected by the user's eye, thereby capturing the user's eye.

For example, coordinate values corresponding to pixels of an image captured by the IR camera on the coordinate system of the IR camera may be previously set. In addition, the processor 1800 may identify a coordinate value corresponding to a feature point of the eye based on a property (e.g., brightness) of IR light received through the IR camera. For example, the processor 1800 may identify the brightness of IR light received through an image sensor of the IR camera including a plurality of photodiodes, and identify at least one pixel that receives IR light indicating the pupil among the pixels of the image captured by the IR camera, thereby identifying a coordinate value 51 corresponding to the pupil central point on the IR coordinate system. In this case, the IR light representing the pupil may be an IR light having a brightness lower than a certain value, but the disclosure is not limited thereto.

Also, for example, the processor 1800 may identify the brightness of the IR light received through the image sensor of the IR camera including the plurality of photodiodes, and may identify at least one pixel representing the glint feature point of the eye among the pixels of the image captured by the IR camera, thereby identifying a coordinate value 52 corresponding to a glint feature point on the IR coordinate system. In this case, the IR light representing the glint feature point of the eye may be an IR light having a brightness greater than a certain value, but the disclosure is not limited thereto.

According to an example embodiment of the disclosure, the light emitter 1510 may be an IR LED that emits blinking light, and in this case, the light reflector 1400 may be an IR event camera. The IR event camera may be an IR camera that is activated when a specific event occurs and automatically captures a subject. The IR event camera may be activated to automatically capture the user's eye, for example, when patterns of blinking light are different.

Figure 5B:
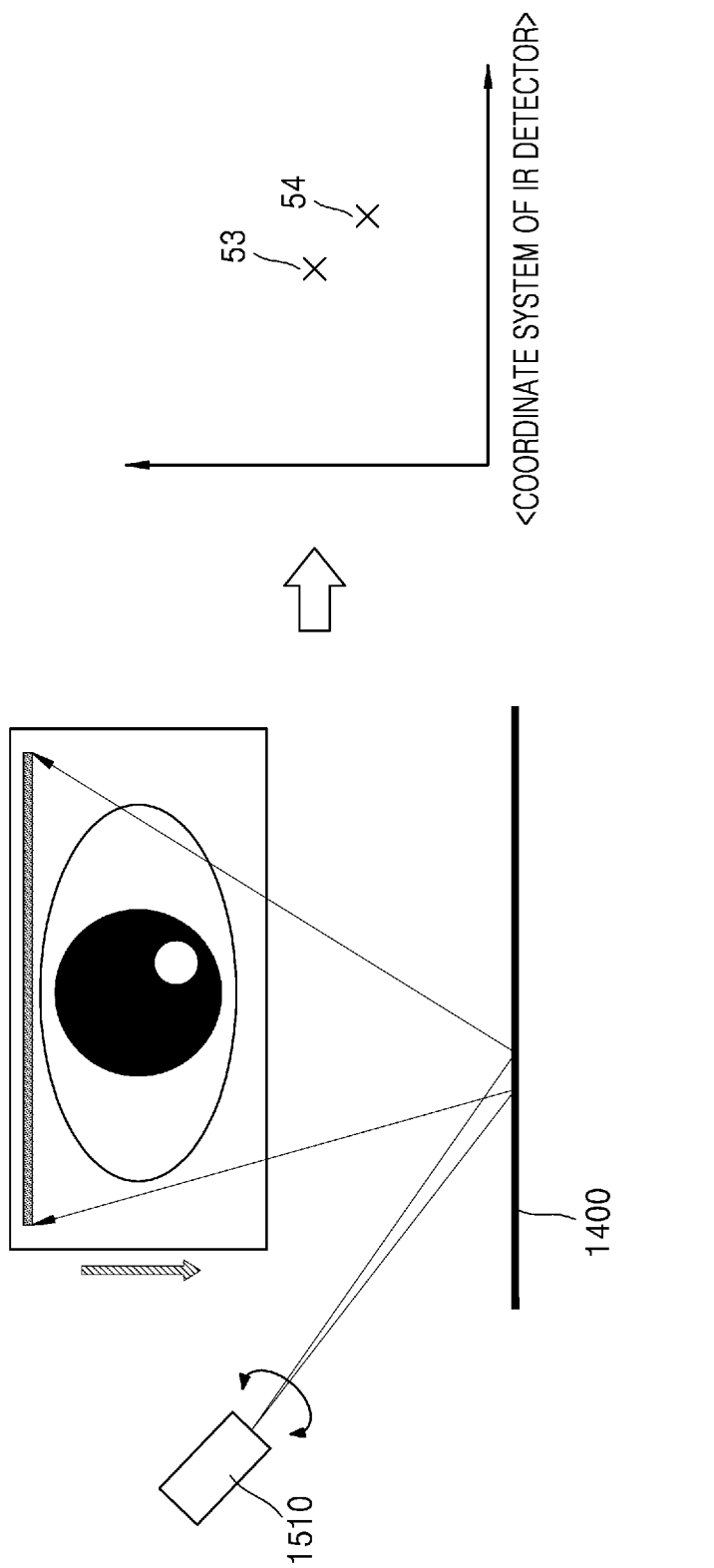
FIG. 5B is a diagram illustrating an example of a light emitter that emits point light, according to an example embodiment of the disclosure.

FIG. 5B is a diagram illustrating an example of the light emitter 1510 that emits point light according to an example embodiment of the disclosure.

Referring to FIG. 5B, the light emitter 1510 of FIG. 2 may be an IR scanner, and the light receiver 1520 of FIG. 2 may be an IR detector. In this case, the light emitter 1510 may emit IR light of a point light toward the light reflector 1400, and the emitted IR light may be reflected by the light reflector 1400 and directed toward user's eye. In this case, the light emitter 1510 may sequentially emit IR lights of point light toward the light reflector 1400 while changing an emission direction to a vertical direction or a horizontal direction, and the sequentially emitted IR lights of point light may be reflected by the light reflector 1400 to cover the entire user's eye. For example, in order to reflect the IR lights of point light sequentially emitted from the IR scanner by using the light reflector 1400 and irradiate the IR lights of point light to a region including the user's eye, the processor 1800 may control irradiation directions of the IR lights emitted from the IR scanner. In this case, the light emitter 1510 may be a 2-dimensional (2D) scanner and the light receiver 1520 may be at least one photodiode.

For example, coordinate values corresponding to the IR lights in the array of lights sequentially received through the IR detector on the coordinate system of the IR detector may be previously set, and the processor 1800 may identify a coordinate value corresponding to a feature point of the eye based on properties (e.g., brightness) of the IR lights in the array of IR lights sequentially received through the IR detector. For example, the processor 1800 may identify coordinate values corresponding to IR lights having a brightness equal to or less than a certain value in the array of the received IR lights on the coordinate system of the IR detector, thereby identifying a coordinate value 53 corresponding to the pupil center point on the IR coordinate system. Also, for example, the processor 1800 may identify coordinate values corresponding to IR lights having a brightness equal to or less than a certain value in the array of the received IR lights on the coordinate system of the IR detector, thereby identifying a coordinate value 54 corresponding to the glint feature point of the eye on the IR coordinate system.

Figure 5C:
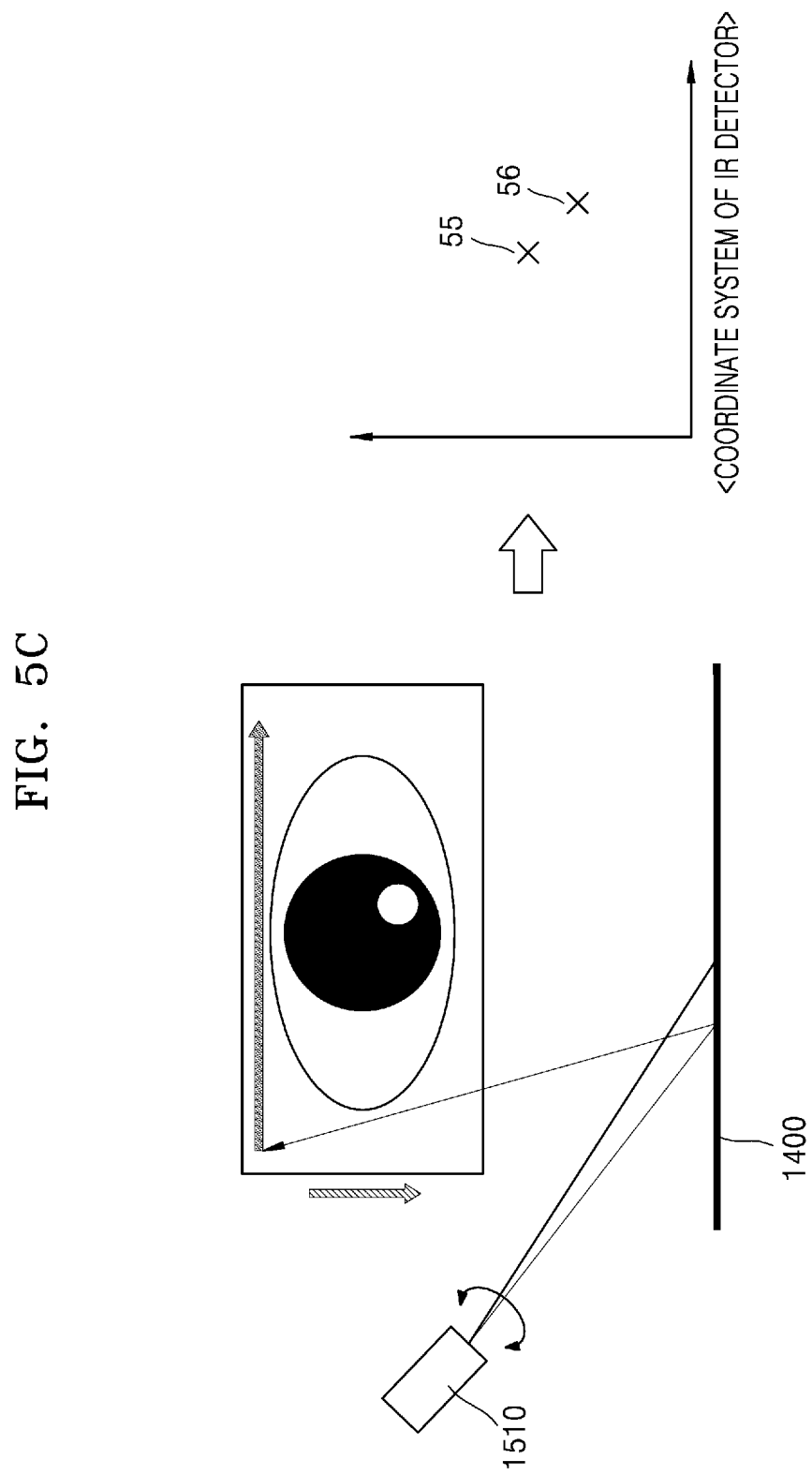
FIG. 5C is a diagram illustrating an example of a light emitter that emits line light, according to an example embodiment of the disclosure.

FIG. 5C is a diagram illustrating an example of the light emitter 1510 that emits line light according to an example embodiment of the disclosure.

Referring to FIG. 5C, the light emitter 1510 of FIG. 2 may be an IR scanner, and the light receiver 1520 of FIG. 2 may be an IR detector. In this case, the light emitter 1510 may emit IR light of line light toward the light reflector 1400, and the emitted IR light may be reflected by the light reflector 1400 and directed toward user's eye. For example, in order to reflect the IR lights of line light sequentially emitted from the IR scanner by using the light reflector 1400 and irradiate the IR lights of point light to a region including the user's eye, the processor 1800 may control irradiation directions of the IR lights emitted from the IR scanner. In this case, the light emitter 1510 may sequentially emit IR lights of line light toward the light reflector 1400 while changing an emission direction, and the sequentially emitted IR lights of line light may be reflected by the light reflector 1400 to cover the entire user's eye. In this case, the light emitter 1510 may be a 1-dimensional (1D) scanner and the light receiver 1520 may be a photodiode array including a plurality of photodiodes. When the light receiver 1520 is the photodiode array, it is more preferable that the light receiver 1520 is provided in the temple 191. For example, when horizontal line light is emitted from the light emitter 1510, the light emitter 1510 may change the emission direction to a vertical direction to cover the region including the user's eye, and, when a vertical line light is emitted from the light emitter 1510, the light emitter 1510 may change the emission direction to the horizontal direction.

For example, coordinate values corresponding to the IR lights in the array of lights sequentially received through the IR detector on the coordinate system of the IR detector may be previously set, and the processor 1800 may identify a coordinate value corresponding to a feature point of the eye based on properties (e.g., brightness) of the IR lights in the array of IR lights sequentially received through the IR detector. For example, the processor 1800 may identify line lights of IR light having a brightness greater than or equal to a certain value, and identify a photodiode corresponding to IR light having a brightness less than or equal to the certain value among a plurality of photodiodes that have received the line lights according to the respective line lights, thereby identifying a coordinate value 55 corresponding to the pupil center point on the IR coordinate system. In addition, for example, the processor 1800 may identify line lights of IR light having a brightness greater than or equal to a certain value, and identify a photodiode corresponding to IR light having a brightness less than or equal to the certain value among a plurality of photodiodes that have received the line lights according to the respective line lights, thereby identifying a coordinate value 56 corresponding to the glint feature point of the eye on the IR coordinate system.

In FIGS. 5A to 5C, for convenience of description, an example in which the AR device 1000 which is the glasses type display device, emits IR light toward user's one eye has been described, but the disclosure is not limited thereto. The AR device 1000 may emit IR light toward the user's other eye in the same manner as illustrated in FIGS. 5A to 5C.

Figure 6A:
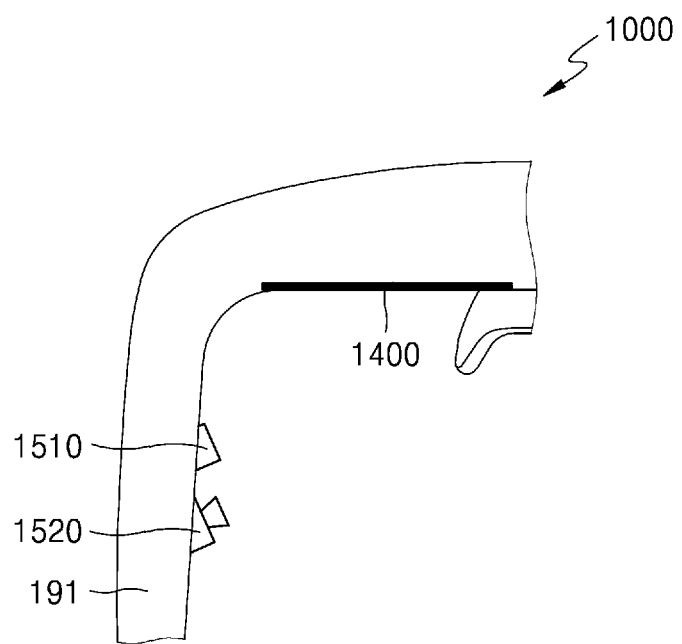
FIG. 6A is a diagram illustrating an example in which a light emitter and a light receiver are arranged in a temple of an AR device, according to an example embodiment of the disclosure.

FIG. 6A is a diagram illustrating an example in which the light emitter 1510 and the light receiver 1520 are provided in the temple 191 of the AR device 1000 according to an example embodiment of the disclosure.

Referring to FIG. 6A, the AR device 1000 of FIG. 2 may be a glasses type device, and the light emitter 1510 and the light receiver 1520 may be provided on the temple 191 of the AR device 1000. The light emitter 1510 and the light receiver 1520 may be provided on an inner side part of the temple 191 of the AR device 1000, which is a position between the temple 191 and user's eyes. For example, the light emitter 1510 and the light receiver 1520 may be provided at positions spaced from a frame by about 10 mm to 15 mm on an inner side of the temple 191 of the AR device 1000 The light emitter 1510 and the light receiver 1520 may be provided to face the light reflector 1400 in the temple 191 of the AR device 1000.

Figure 6B:
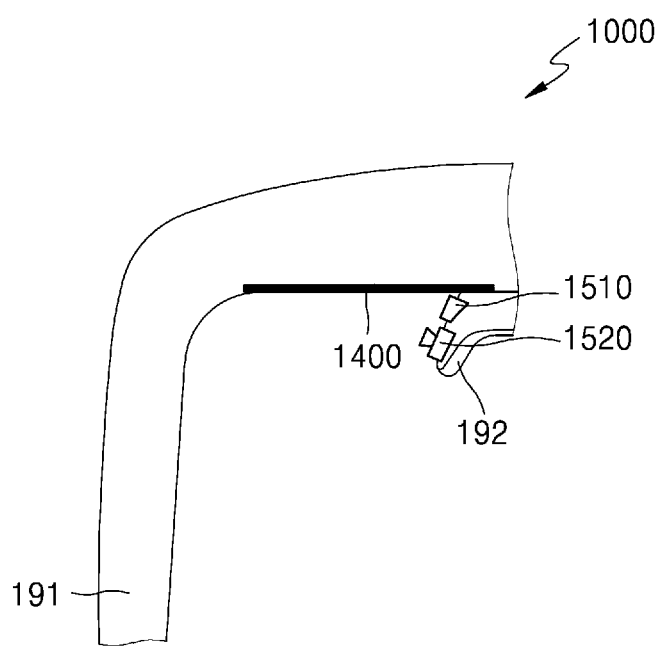
FIG. 6B is a diagram illustrating an example in which a light emitter and a light receiver are arranged in a nose support of an AR device, according to an example embodiment of the disclosure.

FIG. 6B is a diagram illustrating an example in which the light emitter 1510 and the light receiver 1520 are provided in the nose support 192 of the AR device 1000 according to an example embodiment of the disclosure.

Referring to FIG. 6B, the AR device 1000 of FIG. 2 may be a glasses type device, and the light emitter 1510 and the light receiver 1520 may be provided on the nose support 192 of the AR device 1000. The light emitter 1510 and the light receiver 1520 may be provided on an inner side part of the nose support 192 of the AR device 1000, which is a position between the nose support 192 and user's eyes. The light emitter 1510 and the light receiver 1520 may be provided to face the light reflector 1400 in the nose support 192 of the AR device 1000.

Figure 6C:
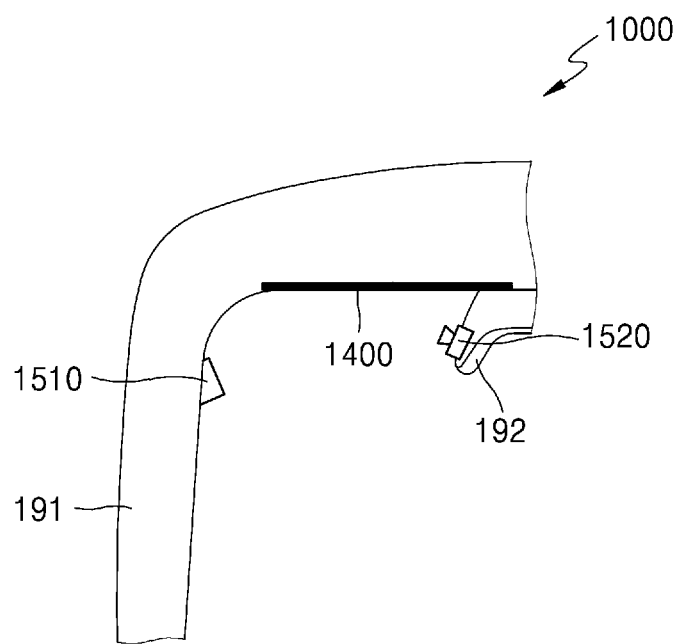
FIG. 6C is a diagram illustrating an example in which a light emitter and a light receiver are arranged in a temple and a nose support of an AR device, according to an example embodiment of the disclosure.

FIG. 6C is a diagram illustrating an example in which the light emitter 1510 and the light receiver 1520 are provided in the temple 191 and the nose support 192 of the AR device 1000 according to an example embodiment of the disclosure.

Referring to FIG. 6C, the AR device 1000 of FIG. 2 may be a glasses type device, the light emitter 1510 may be provided on the temple 191 of the AR device 1000, and the light receiver 1520 may be provided on the nose support 192 of the AR device 1000. The light emitter 1510 may be provided on an inner side part of the temple 191 of the AR device 1000, which is a position between the temple 191 and user's eyes. The light receiver 1520 may be provided on an inner side part of the nose support 192 of the AR device 1000, which is a position between the nose support 192 and user's eyes. The light emitter 1510 and the light receiver 1520 may be provided to face the light reflector 1400 in the AR device 1000.

Figure 6D:
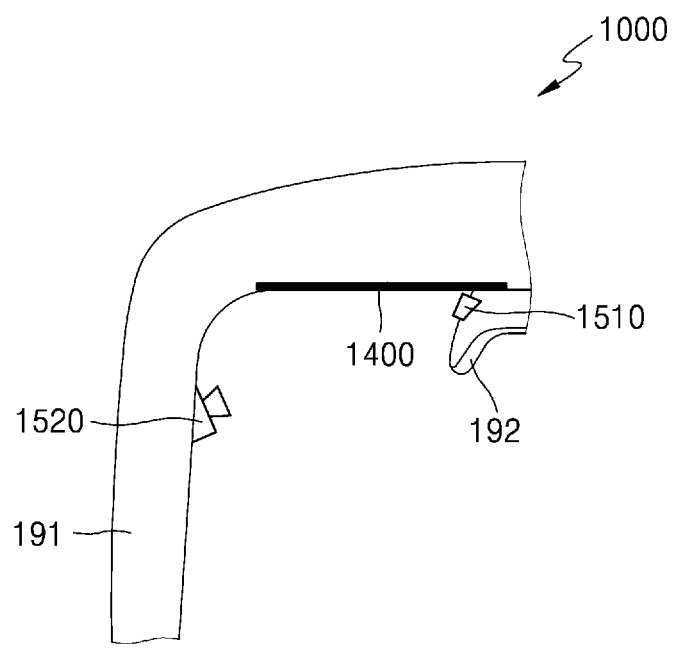
FIG. 6D is a diagram illustrating an example in which a light emitter and a light receiver are arranged in a temple and a nose support of an AR device, according to an example embodiment of the disclosure.

FIG. 6D is a diagram illustrating an example in which the light emitter 1510 and the light receiver 1520 are provided in the temple 191 and the nose support 192 of the AR device 1000 according to an example embodiment of the disclosure.

Referring to FIG. 6D, the AR device 1000 of FIG. 2 may be a glasses-type device, the light emitter 1510 may be provided on the nose support 192 of the AR device 1000, and the light receiver 1520 may be provided on the temple 191 of the AR device 1000. The light emitter 1510 may be provided on an inner side part of the nose support 192 of the AR device 1000, which is a position between the nose support 192 and user's eyes. The light receiver 1520 may be provided on an inner side part of the temple 191 of the AR device 1000, which is a position between the temple 191 and user's eyes. The light emitter 1510 and the light receiver 1520 may be provided to face the light reflector 1400 in the AR device 1000.

In FIGS. 6A to 6D, it has been described that one light emitter 1510 and one light receiver 1520 are provided in the AR device 1000, but the disclosure is not limited thereto. For example, a plurality of light emitters 1510 may be provided in the AR device 1000. In this case, the plurality of light emitters 1510 may be provided on the temple 191, or the plurality of light emitters 1510 may be provided on the nose support 192. Alternatively, the plurality of light emitters 1510 may be dividedly provided on the temple 191 and the nose support 192.

Also, for example, the plurality of light receivers 1520 may be provided in the AR device 1000. In this case, the plurality of light receivers 1520 may be provided on the temple 191, or the plurality of light receivers 1520 may be provided on the nose support 192. Alternatively, the plurality of light receivers 1520 may be dividedly provided on the temple 191 and the nose support 192.

In FIGS. 6A to 6D, for convenience of description, it has been described that the light emitter 1510 and the light receiver 1520 are provided in a left eye part of the AR device 1000, which is the glasses type display device, but the disclosure is not limited thereto. In the AR device 1000, the light emitter 1510 and the light receiver 1520 may be provided in a right eye part of the AR device 1000 in the same manner as illustrated in FIGS. 6A to 6D.

Figure 7A:
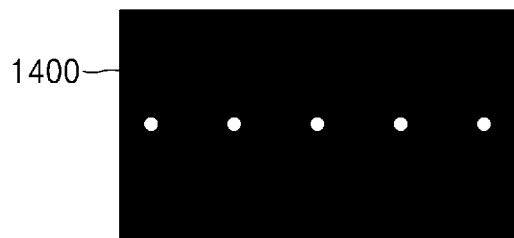
FIG. 7A is a diagram illustrating an example of a dot pattern formed on a light reflector of an AR device, according to an example embodiment of the disclosure.
Figure 7B:
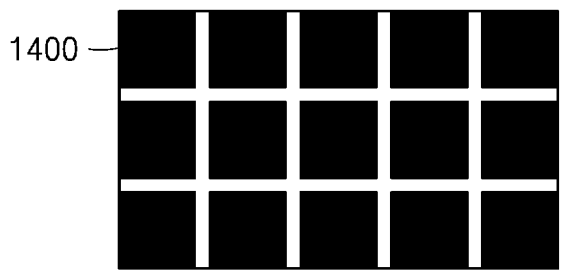
FIG. 7B is a diagram illustrating an example of a grid pattern formed on a light reflector of an AR device, according to an example embodiment of the disclosure.
Figure 7C:
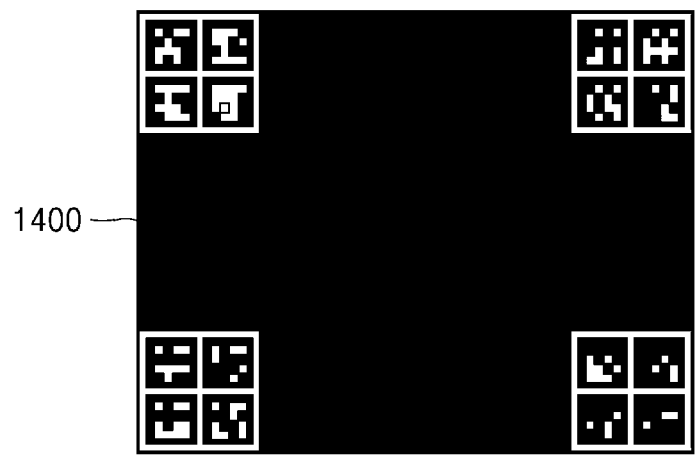
FIG. 7C is a diagram illustrating an example of a pattern in the form of a 2D marker, according to an example embodiment of the disclosure.
Figure 7D:
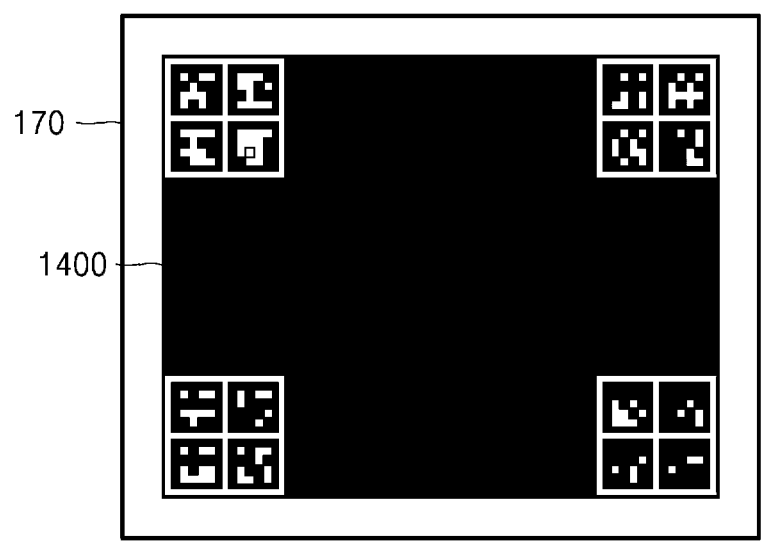
FIG. 7D is a diagram illustrating an example of a light reflector that covers a part of a waveguide, according to an example embodiment of the disclosure.

FIG. 7A is a diagram illustrating an example of a dot pattern formed on the light reflector 1400 of the AR device 1000 according to an example embodiment of the disclosure, FIG. 7B is a diagram illustrating an example of a grid pattern formed on the light reflector 1400 of the AR device 1000 according to an example embodiment of the disclosure, FIG. 7C is a diagram illustrating an example of a pattern in the form of a 2D marker according to an example embodiment of the disclosure, and FIG. 7D is a diagram illustrating an example of the light reflector 1400 that covers a part of the waveguide 170 according to an example embodiment of the disclosure.

Referring to FIG. 7A, the dot-shaped pattern may be formed on the light reflector 1400 of the AR device 1000 of FIG. 2. Referring to FIG. 7B, the grid-shaped pattern may be formed on the light reflector 1400 of the AR device 1000 of FIG. 2. According to an example embodiment, IR light may not be reflected from a part where the pattern is formed. At this time, because the dot-shaped pattern or the grid-shaped pattern is for detecting bias of a support or a temple of an AR device, it is preferable to have a regular shape.

Referring to FIG. 7C, the pattern formed on a part of the light reflector 1400 of the AR device 1000 of FIG. 2 at which the user's gaze is less frequently directed. The formed pattern may be, for example, a pattern in the form of the 2D marker, but the disclosure is not limited thereto. The pattern may be formed on, for example, a part of the light reflector 1400 that does not interfere with capturing or scanning the user's eyes.

Referring to FIG. 7D, the light reflector 1400 may be formed on a part of the waveguide 170 of the AR device 1000 of FIG. 2. For example, the light reflector 1400 may not be located in a part of the waveguide 170 which has little relation to reflection of IR light.

For example, when the light receiver 1520 is an IR camera, the IR camera may capture the user's eyes based on the IR light reflected by the light reflector 1400, and the IR light may not be reflected from the part where the pattern is formed. For example, a part of an image obtained by capturing the user's eyes in which the IR light is not reflected may be in black, and the processor 1800 may identify the black part in the image obtained by capturing the user's eyes, thereby identifying the pattern in the image.

For example, when the light receiver 1520 is an IR detector, the IR detector may sequentially receive IR lights reflected by the light reflector 1400, and the IR light may not be reflected from the part where the pattern is formed. For example, the processor 1800 may identify a part of an IR light array formed by the sequentially received IR lights, from which the IR light is not reflected, thereby identifying the pattern of the light reflector 1400.

Figure 8A:
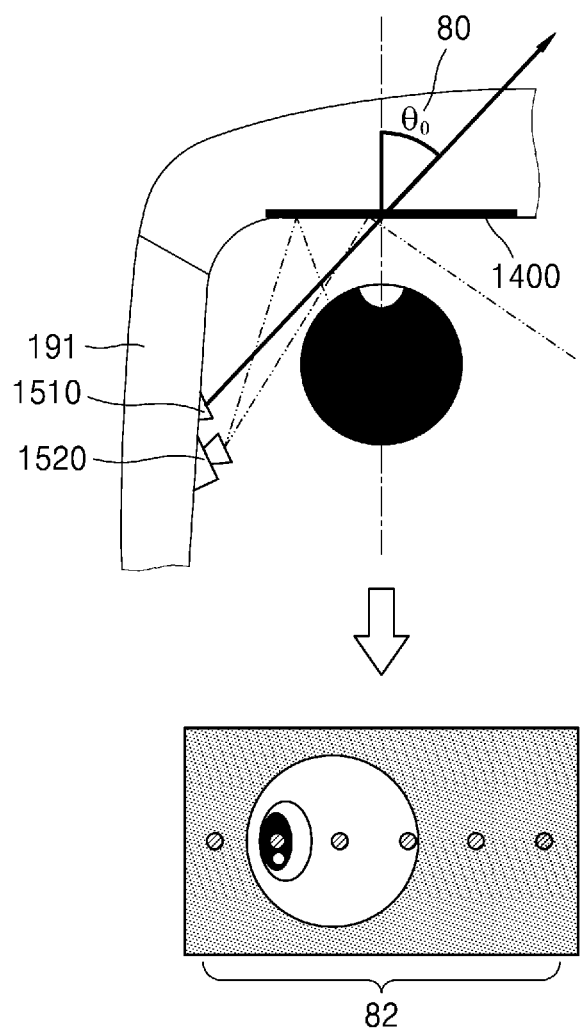
FIG. 8A is a diagram illustrating a light emission angle and a pattern before a temple of an AR device is biased, according to an example embodiment of the disclosure.
Figure 8B:
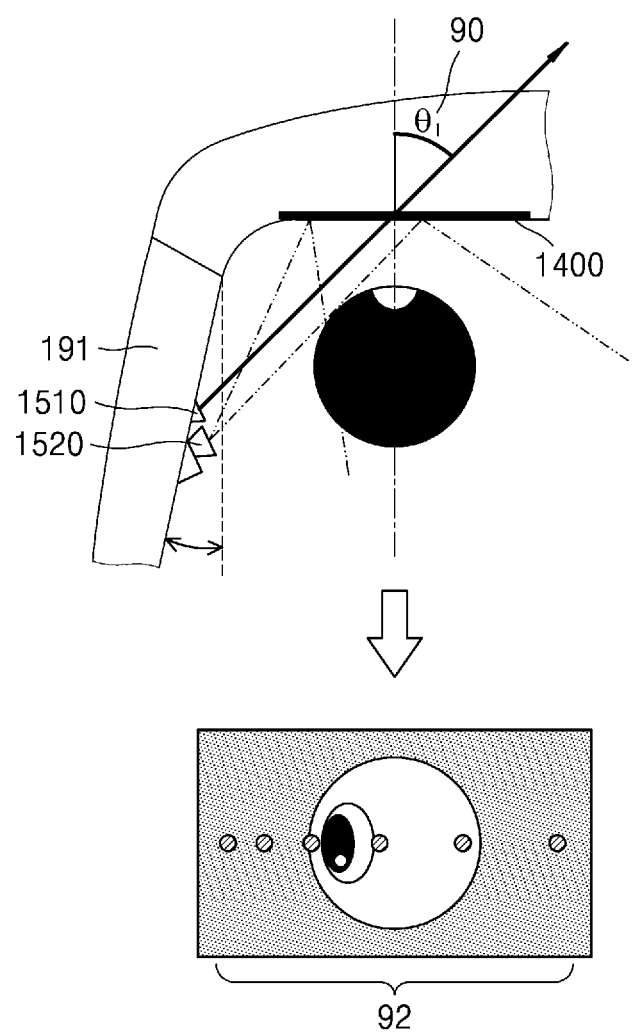
FIG. 8B is a diagram illustrating a light emission angle and a pattern after a temple of an AR device, is biased according to an example embodiment of the disclosure.

FIG. 8A is a diagram illustrating a light emission angle and a pattern before the temple 191 of the AR device 1000 is biased according to an example embodiment of the disclosure, and FIG. 8B is a diagram illustrating a light emission angle and a pattern after the temple 191 of the AR device 1000 is biased according to an example embodiment of the disclosure.

Referring to FIG. 8A, in the glasses type AR device 1000 as shown in FIG. 2, before the temple 191 is biased, the light emitter 1510 may emit IR light toward the light reflector 1400 on which a point pattern is formed. According to an example embodiment, the light emitter 1510 may emit IR light toward the light reflector 1400 at a first light emission angle 80, and a first pattern 82 may be identified by the AR device 1000 based on the IR light received by the light receiver 1520.

In addition, referring to FIG. 8B, in the glasses type AR device 1000 as shown in FIG. 2, after the temple 191 is biased, the light emitter 1510 may emit IR light toward the light reflector 1400 at a second light emission angle 90, and a second pattern 92 may be identified by the AR device 1000 based on the IR light received by the light receiver 1520.

As shown in FIGS. 8A and 8B, the first pattern 82 and the second pattern 92 may include dots with different spaces from each other, and the AR device 1000 may compare the first pattern 82 and the second pattern 92, thereby identifying degree of bias of the temple 191. For example, a bias angle with respect to the first pattern 82 may be set to '0', and a bias angle with respect to the second pattern 92 may be calculated based on differences in positions between points in the first pattern 82 and points in the second pattern 92. For example, the bias angle with respect to the second pattern 92 may be a difference value between the first light emission angle 80 and the second light emission angle 90. For example, when a pattern corresponding to the first light emission angle 80 is the first pattern 82 and a pattern corresponding to the first light emission angle 80 is the second pattern 92, the processor 1800 may compare spaces of the dots in the first pattern 82 with the spaces of the dots in the second pattern 92, thereby identifying difference values of the spaces of the dots in the second pattern 92 with respect to the spaces of the dots in the first pattern 82, and may input the identified difference values into at least one function for calculating degree of bias of the temple 191, thereby calculating the degree of bias of the temple 191 indicating a difference between the first light emission angle 80 corresponding to the first pattern 82 and the second light emission angle 90 corresponding to the second pattern 92.

In addition, for example, when a pattern corresponding to the first light emission angle 80 is the first pattern 82 and a pattern corresponding to the first light emission angle 80 is the second pattern 92, the processor 1800 may compare positions of the dots in the first pattern 82 with the positions of the dots in the second pattern 92, thereby identifying difference values of the positions of the dots in the second pattern 92 with respect to the positions of the dots in the first pattern 82, and may input the identified difference values into at least one function for calculating degree of bias of the temple 191, thereby calculating the degree of bias of the temple 191 indicating a difference between the first light emission angle 80 corresponding to the first pattern 82 and the second light emission angle 90 corresponding to the second pattern 92.

According to another example embodiment, the processor 1800 may identify the degree of bias of the temple 191 based on the second pattern 92 without comparing the first pattern 82 and the second pattern 92. In this case, the processor 1800 may identify the difference values of the spaces of the dots in the second pattern 92, and input the identified difference values into at least one function for calculating the degree of bias of the temple 191, thereby calculating the degree of bias of the temple 191.

Figure 9:
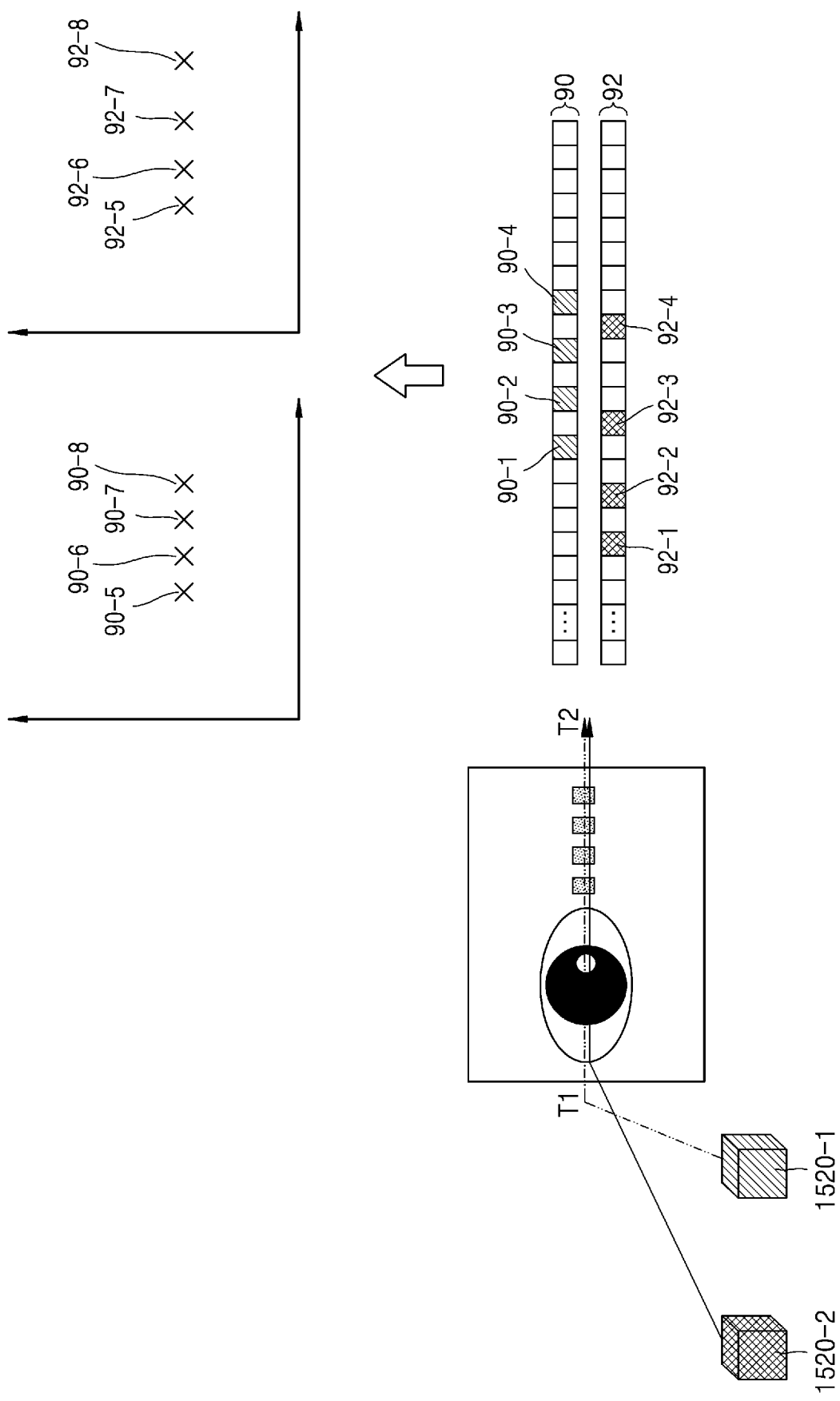
FIG. 9 is a diagram illustrating an example of a pattern identified from an array of light received through a light receiver when a light emitter of an AR device is an infrared (IR) scanner, according to an example embodiment of the disclosure.

FIG. 9 is a diagram illustrating an example of a pattern identified from an array of light received through the light receiver 1520 when a light emitter of the AR device 1000 is an IR scanner 1520-1 or 1520-2 according to an example embodiment of the disclosure.

Referring to FIG. 9, the IR scanner 1520-1 may represent an IR scanner before the support 190 of the glasses type AR device 1000 as shown in FIG. 2 is biased. The IR scanner 1520-1 may sequentially emit IR light of point lint toward a region where user's eyes are located by using the light reflector 1400, and the light receiver 1520 may receive a first light array 90.

In addition, the IR scanner 1520-2 may represent the IR scanner after the support 190 of the AR device 1000 is biased. The IR scanner 1520-2 may sequentially emit IR light of point lint toward the region where user's eyes are located by using the light reflector 1400, and the light receiver 1520 may receive a second light array 92.

In the first light array 90 and the second light array 92, positions and spaces of light signals corresponding to dot patterns of the light reflector 1400 may be different from each other, and the AR device 1000 may compare a part corresponding to the dot pattern of the light reflector 1400 in the first light array 90 and a part corresponding to the dot pattern of the light reflector 1400 in the second light array 92. Also, the AR device 1000 may identify degree of bias of the support 190 of the AR device 1000 based on results of comparison.

For example, because IR light emitted toward the dot pattern is not reflected by the light reflector 1400, light signal may not be received in parts 90-1, 90-2, 90-3, and 90-4 of the first light array 90 corresponding to dot patterns and parts 92-1, 92-2, 92-3, and 92-4 of the second light array 92 corresponding to dot patterns. The processor 1800 may identify parts of the first light array 90 from which no light signal is received, thereby identifying the parts 90-1, 90-2, 90-3, and 90-4 of the first light array 90 corresponding to the dot patterns, and identifying coordinate values 90-5, 90-6, 90-7, and 90-8 on a coordinate system of the IR scanner 1520-1 respectively indicating the parts 90-1, 90-2, 90-3, and 90-4 corresponding to the dot patterns. Also, for example, the processor 1800 may identify parts of the second light array 92 from which no light signal is received, thereby identifying the parts 92-1, 92-2, 92-3, and 92-4 of the second light array 92 corresponding to the dot patterns, and identifying coordinate values 92-5, 92-6, 92-7, and 92-8 on a coordinate system of the IR scanner 1520-2 respectively indicating the parts 92-1, 92-2, 92-3, and 92-4 corresponding to the dot patterns.

The processor 1800 may compare the coordinate values 90-5, 90-6, 90-7, and 90-8 on the coordinate system of the IR scanner 1520-1 respectively indicating the parts 90-1, 90-2, 90-3, and 90-4 of the first light array 90 corresponding to the dot patterns with the coordinate values 92-5, 92-6, 92-7, and 92-8 on the coordinate system of the IR scanner 1520-2 respectively indicating the parts 92-1, 92-2, 92-3, and 92-4 of the second light array 92 corresponding to the dot patterns, thereby identifying differences between the coordinate values 90-5, 90-6, 90-7, and 90-8 and the coordinate values 92-5, 92-6, 92-7, and 92-8. For example, the processor 1800 may calculate the degree of bias of the support 190 of the AR device 1000, based on a difference value between the coordinate value 90-5 and the coordinate value 92-5, a difference value between the coordinate value 90-6 and the coordinate value 92-6, a difference value between the coordinate value 90-7 and the coordinate value 92-7, and a difference value between the coordinate value 90-8 and the coordinate value 92-8.

In FIG. 9, for convenience of description, the IR scanner 1520-1 before the support 190 is biased and the IR scanner 1520-2 after the support 190 of the AR device 1000 is biased are illustrated separately in FIG. 9, in order to distinguish the IR scanner 1520-1 before the support 190 of the AR device 1000 is biased from the IR scanner 1520-2 after the support 190 of the AR device 1000 is biased. However, the IR scanner 1520-1 before the support 190 is biased and the IR scanner 1520-2 after the support 190 of the AR device 1000 may be a same IR scanner installed in the AR device 1000.

In addition, in FIG. 9, for convenience of description, it has been described that one first light array 90 is used to identify the dot pattern using the IR scanner 1520-1 before the support 190 is biased, and one second light array 92 is used to identify the dot pattern using the IR scanner 1520-2 after the support 190 of the AR device 1000 is biased, but the disclosure is not limited thereto. A plurality of light arrays for covering the dot pattern may be used to identify the dot pattern using the IR scanner 1520-1 before the support 190 is biased, and a plurality of light arrays for covering the dot pattern may be used to identify the dot pattern using the IR scanner 1520-2 after the support 190 is biased.

Figure 10:
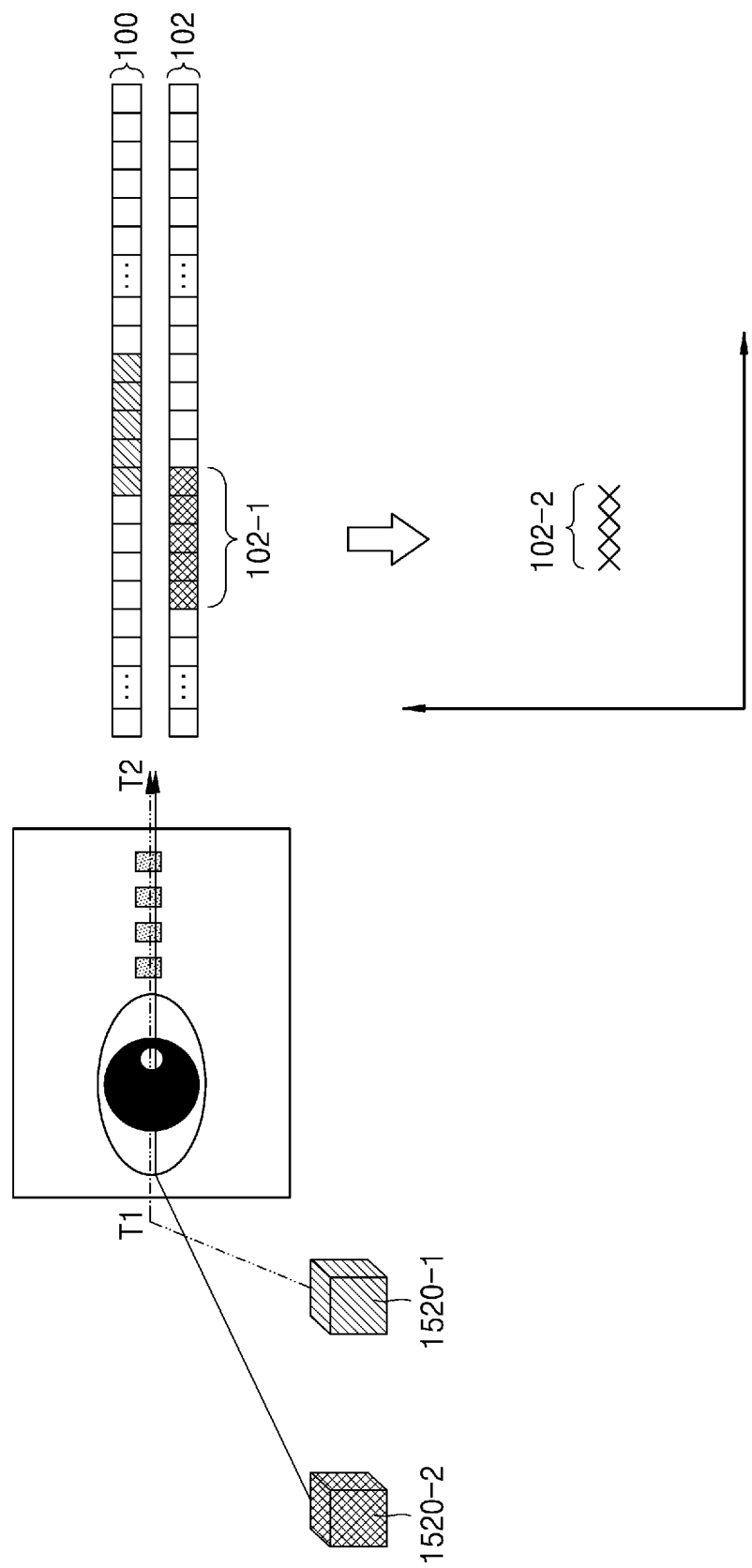
FIG. 10 is a diagram illustrating an example of an eye feature identified from an array of light received through a light receiver of the AR device when a light emitter of an AR device is an IR scanner, according to an example embodiment of the disclosure.

FIG. 10 is a diagram illustrating an example of an eye feature identified from an array of light received through the light receiver 1520 when a light emitter of the AR device 1000 is the IR scanner 1520-1 or 1520-2 according to an example embodiment of the disclosure.

Referring to FIG. 10, the IR scanner 1520-1 before the support 190 of the glasses type AR device 1000 as shown in FIG. 2 is biased may sequentially emit IR light of point lint toward a region where user's eyes are located by using the light reflector 1400, and the light receiver 1520 may receive a third light array 100.

In addition, after the support 190 of the AR device 1000 is biased, the IR scanner 1520-2 may sequentially emit IR light of point lint toward the region where user's eyes are located by using the light reflector 1400, and the light receiver 1520 may receive a fourth light array 102.

In the third light array 100 and the fourth light array 102, positions and spaces of light signals corresponding to feature points of eyes may be different from each other. The AR device 1000 may calibrate positions of parts corresponding to the feature points of the eyes from the fourth light array 102 in consideration of a bias angle of the support 190.

For example, the processor 1800 may identify parts 102-1 in the fourth light array 102 corresponding to the glint feature points of the eyes, based on brightness of lights in the fourth light array 102, and identify coordinate values 102-2 on the coordinate system of the IR scanner indicating the parts 102-1 corresponding to the glint feature points of the eyes. Thereafter, the processor 1800 may calibrate the coordinate values 102-2 indicating the glint feature points of the eyes by using the bias angle calculated in FIG. 9. For example, the processor 1800 may multiply the coordinate values 102-2 representing the glint feature points of the eyes by a compensation matrix 18 of FIG. 11 which will be described below, thereby obtaining calibrated coordinate values.

In FIG. 10, for convenience of description, the IR scanner 1520-1 before the support 190 is biased and the IR scanner 1520-2 after the support 190 of the AR device 1000 is biased are illustrated separately in FIG. 10, in order to distinguish the IR scanner 1520-1 before the support 190 of the AR device 1000 is biased from the IR scanner 1520-2 after the support 190 of the AR device 1000 is biased. However, the IR scanner 1520-1 before the support 190 is biased and the IR scanner 1520-2 after the support 190 of the AR device 1000 are the same IR scanners installed in the AR device 1000.

In addition, in FIG. 10, for convenience of description, it has been described that third light array 100 is used to identify feature points of eyes using the IR scanner 1520-1 before the support 190 is biased, and one fourth light array 102 is used to identify feature points of eyes using the IR scanner 1520-2 after the support 190 of the AR device 1000 is biased, but the disclosure is not limited thereto. A plurality of light arrays for covering user's eyes may be used to identify feature points of eyes using the IR scanner 1520-1 before the support 190 is biased, and a plurality of light arrays for covering user's eyes may be used to identify feature points of eyes using the IR scanner 1520-2 after the support 190 is biased.

FIG. 11 is a diagram illustrating examples of functions used by the AR device 1000 to calculate a center of an eyeball and calculate a gaze point 16 of a user according to an example embodiment of the disclosure.

Equation 11 represents a relationship between a coordinate value 12 of a pupil center of the eye in a coordinate system of an IR camera and a coordinate value 13 in real space representing the center of the eyeball. In an example embodiment of the disclosure, the coordinate value 12 of the coordinate system of the IR camera may have a 2D coordinate value, and the coordinate value 13 of the real space may have a 2D coordinate value or a 3D coordinate value.

For example, when the coordinate value 13 representing the center of the eyeball is multiplied by a camera rotation matrix 20 and a scale factor and a value representing a bias in an image is added, the coordinate value 12 of the pupil center of the eye may be calculated. The camera rotation matrix 20 is a matrix that converts a coordinate value in real space into a coordinate value of a camera coordinate system in consideration of a position in which a camera is provided. The coordinate value 13 representing the center of the eyeball may be converted into the coordinate value of the coordinate system of the IR camera by multiplying the coordinate value 13 representing the center of the eyeball by the camera rotation matrix 20, and the size of the converted coordinate value may be normalized by multiplying the converted coordinate value by a scale factor. In addition, by adding a value indicating the bias in the image to the normalized size of the coordinate value, a normalized 2D coordinate value may be corrected by reflecting the bias in the image so that the coordinate value 12 of the pupil center of the eye may be calculated. In addition, the value representing the bias in the image may be used to arrange a position of the eye in an image captured by the IR camera in a reference position. For example, the value representing the bias in the image may be a value for moving a center point of the eye in the captured image to a center point of the captured image, based on a difference between the center point of the image captured by the IR camera and the center point of the eye in the captured image.

In an example embodiment of the disclosure, the camera rotation matrix 20, the scale factor and the value representing the bias in the image may be determined in consideration of, for example, a position in which an IR LED is provided, a position in which the IR camera is provided, a capturing direction of the IR camera, an angle of view of the IR camera, the image captured by the IR camera, information related to the human eye (e.g., eyeball size, pupil size, etc.), previously captured eye images, etc., and may be previously set in the AR device 1000 during manufacturing of the AR device 1000.

In an example embodiment of the disclosure, the AR device 1000 may input the coordinate value 12 of the pupil center of the eye into Equation 11, thereby obtaining the coordinate value 13 representing the center of the eyeball.

Equation 15 may represent a relationship between values 17 representing feature points of the eye and the gaze point 16 of the user. For example, the feature points calibrated by reflecting a bias of the support 190 may be obtained by multiplying the values 17 representing the feature points of the eye by a compensation matrix 18. In addition, a value 19 that is output by inputting a value obtained by multiplying the values 17 representing the feature points of the eye by the compensation matrix 18 into a mapping function F may be a coordinate value 16 representing the gaze point of the user. The compensation matrix 18 may be a matrix for compensating for degree of a bias of the support 190. The compensation matrix 18 may be determined through comparison between images captured from the IR camera in a state in which the support 190 of the AR device 1000 of FIG. 2 is not biased and images captured by the IR camera in a state in which the support 190 of the AR device 1000 is biased, and the compensation matrix 18 may be previously set in the AR device 1000 during manufacturing of the AR device 1000. For example, the compensation matrix 18 may be determined so that the images captured from the IR camera in a state in which the support 190 is biased may be converted into the images captured by the IR camera in a state in which the support 190 is not biased, in consideration of the degree of the bias of the support 190. However, the example in which the compensation matrix 18 is determined is not limited thereto.

For example, the compensation matrix 18 may be determined through comparison between information obtained from the images captured from the IR camera in a state in which the support 190 is not biased and information obtained from the images captured by the IR camera in a state in which the support 190 of the AR device 1000 is biased. Data obtained from an image may include, for example, a size of the image, a position of the eye in the image, a position of the pupil in the image, a position of a pattern in the image, etc., but the disclosure is not limited thereto.

Alternatively, for example, the compensation matrix 18 may be determined by comparing the images captured from the IR camera in a state in which the support 190 is not biased and the information obtained from the images captured by the IR camera in a state in which the support 190 of the AR device 1000 is biased. Alternatively, for example, the compensation matrix 18 may be determined by comparing the information obtained from the images captured from the IR camera in a state in which the support 190 is not biased and the images captured by the IR camera in a state in which the support 190 of the AR device 1000 is biased.

In addition, the mapping function F, which is a function for calculating the gaze point of the user from the feature points of the eye, may be determined such that the gaze point of the user is calculated from the reward matrix 18 and the feature points of the eye, and may be previously set in the AR device 1000 during manufacturing of the AR device 1000.

The AR device 1000 may obtain the coordinate value 16 representing the gaze point of the user from positions of the feature points of the eye using Equation 15.

FIG. 12 is a flowchart of a method, performed by the AR device 1000 of FIGS. 2 and 3, of detecting a user's gaze according to an example embodiment of the disclosure.

In operation S1200, the AR device 1000 may emit IR light toward the light reflector 1400 through the light emitter 1510 installed on the support 190 extending from the frame 110 of the AR device 1000. The AR device 1000 may emit the IR light toward at least a partial region of the light reflector 1400 so that the IR light reflected by the light reflector 1400 may cover user's eyes.

For example, when the light receiver 1520 is an IR camera, the light emitter 1510 may be an IR LED, and the AR device 1000 may control the IR LED so that the IR light emitted from the IR LED may be reflected by the light reflector 1400 and may cover the user's eyes, in order for the IR camera to capture the user's eyes. Alternatively, for example, when the light receiver 1520 is an IR detector, the light emitter 1510 may be an IR scanner, and the AR device 1000 may control the IR scanner to scan the user's eyes by reflecting the IR light emitted from the IR scanner by using the light reflector 1400, so that the IR detector may detect the user's eyes.

In operation S1205, the AR device 1000 may receive the IR light reflected by the user's eye and reflected back by the light reflector 1400, through the light receiver 1520 installed on the support 190 extending from the frame 110 of the AR device 1000.

For example, when the light emitter 1510 is an IR LED, the light receiver 1520 may be an IR camera, and the AR device 1000 may control the IR camera to capture the user's eyes through the light reflected by the light reflector 1400 from the user's eyes. Alternatively, for example, when the light emitter 1510 is an IR scanner, the light receiver 1520 may be an IR detector, and the AR device 1000 may control the IR detector to detect the IR light reflected by the user's eye and reflected back by the light reflector 1400, so that the IR detector may detect the user's eyes.

In operation S1210, the AR device 1000 may detect previously set features related to the gaze of the user's eyes based on the received IR light. For example, the AR device 1000 may detect a position of a pupil feature point of the user's eyes and a position of a glint feature point of the eyes. The pupil feature point may be, for example, a pupil central point, and the glint feature point of the eyes may be a part having brightness greater than or equal to a certain value in a detected eye region. The position of the pupil feature point and the position of the glint feature point of the eyes may be identified, for example, by a coordinate value indicating a position in a coordinate system of the light receiver 1520. For example, the coordinate system of the light receiver 1520 may be a coordinate system of an IR camera or a coordinate system of the IR detector, and the coordinate value in the coordinate system of the light receiver 1520 may be a 2D coordinate value.

The AR device 1000 may detect previously set features related to the gaze of the eyes by analyzing the light received by the light receiver 1520. For example, when the light receiver 1520 is an IR camera, the AR device 1000 may identify the position of the pupil feature point and the position of the glint feature point of the eyes in an image captured by the IR camera. Alternatively, for example, when the light receiver 1520 is an IR detector, the AR device 1000 may analyze the IR light detected by the IR detector, thereby identifying the position of the pupil feature point and the position of the glint feature point of the eyes.

In addition, the AR device 1000 may analyze the light received by the light receiver 1520, thereby obtaining a coordinate value indicating the position of the pupil feature point and a coordinate value indicating the position of the glint feature point of the eyes. For example, when the light receiver 1520 is an IR camera, the AR device 1000 may obtain the coordinate value of the pupil feature point and the coordinate value of the glint feature point of the eyes from the coordinate system of the IR camera. For example, when the light receiver 1520 is an IR camera, the AR device 1000 may identify the position of the pupil central point in an image captured by the IR camera. For example, the position of the pupil central point may have a coordinate value in the coordinate system of the IR camera.

For example, the AR device 1000 may identify a position of the brightest point in the image captured by the IR camera, in order to identify the glint feature point of the eyes. The AR device 1000 may identify the brightness of the IR light received through an image sensor of the IR camera including a plurality of photodiodes, and may identify at least one pixel corresponding to bright IR light equal to or greater than a certain reference among pixels of the image captured by the IR camera, thereby identifying the position of the glint feature point of the eyes. For example, the AR device 1000 may identify the pixel corresponding to the brightest IR light among the pixels of the image captured by the IR camera, thereby identifying the position of the glint feature point of the eyes. For example, the position of the glint feature point of the eyes may have a coordinate value in the coordinate system of the IR camera.

Alternatively, for example, when the light receiver 1520 is an IR detector, the AR device 1000 may calculate the coordinate value of the pupil feature point and the coordinate value of the glint feature point of the eyes in the coordinate system of the IR detector.

When the light emitter 1510 is an IR scanner, the AR device 1000 may control the IR scanner to sequentially irradiate a point light source or a line light source to cover a region where the user's eyes are located, and sequentially receive the light reflected from the user's eyes through the IR detector in order to scan the region where the user's eyes are located. Also, the AR device 1000 may analyze an array of light sequentially received through the IR detector, thereby identifying the pupil feature point and the glint feature point of the eyes. For example, the AR device 1000 may identify light having a brightness equal to or greater than a certain value in the received light array, thereby identifying a coordinate of the glint feature point of the eyes. For example, the position of the glint feature point of the eyes may have a coordinate value in the coordinate system of the IR detector.

In operation S1215, the AR device 1000 may detect a pattern of the light reflector 1400 based on the received IR light. The light reflector 1400 may be coated on one surface of the waveguide 170 of the AR device 1000 to have a certain pattern. The AR device 1000 may receive the IR light reflected by the user's eyes and reflected by the light reflector 1400 through the light receiver 1520, and identify a shape of the pattern based on the received IR light. The pattern formed on the light reflector 1400 may include, for example, a dot pattern, a line pattern, a grid pattern, a 2D marker, etc., but the disclosure is not limited thereto. When the temple 191 is biased with respect to the frame 110, the pattern identified by the pattern detection code 1740 may have a deformed shape.

For example, when the light receiver 1520 is an IR camera, the IR camera may capture the user's eyes based on the IR light reflected by the light reflector 1400, and the AR device 1000 may identify a pattern within an image obtained by capturing the user's eyes from the image. For example, when the light receiver 1520 is an IR detector, the IR detector may sequentially receive IR lights reflected by the light reflector 1400, and the AR device 1000 may identify a part related to the pattern of the light reflector 1400 in an array of the sequentially received IR lights.

In operation S1220, the AR device 1000 may determine a degree to which the support 190 of the AR device 1000 is biased with respect to the frame 110. When the IR light is received after the support 190 is biased with respect to the frame 110, the AR device 1000 may identify a pattern having a deformed shape from the received IR light. Also, for example, as in FIGS. 8A and 8B, the AR device 1000 may compare the pattern having the deformed shape with a non-deformed pattern, thereby estimating the degree of bias of the support 190. For example, the degree of bias of the temple 191 may be expressed as a bias angle indicating a difference between a default angle of the temple 191 with respect to the frame 110 and an angle of the biased temple 191 with respect to the frame 110, but the disclosure is not limited thereto. Also, for example, the degree of bias of the nose support 192 may be expressed as a bias angle indicating a difference between a default angle of the nose support 192 with respect to the frame 110 and an angle of the biased nose support 192 with respect to the frame 110, but the disclosure is not limited thereto.

Also, for example, when the light receiver 1520 is an IR detector, the coordinate value of the pupil feature point and the coordinate value of the glint feature point of the eyes may be values calibrated by reflecting the degree of bias of the support 190 of the AR device 1000. When the light receiver 1520 is an IR detector, for example, when the coordinate values 102-2 corresponding to the IR lights 102-1 corresponding to the feature points of the eyes in the light array 102 of FIG. 10 are calculated, the degree of bias of the support 190 may be reflected. For example, the AR device 1000 may calibrate positions of the lights 102-1 corresponding to the feature points of the eyes in the light array 102 among the lights in the light array 102 received by the IR detector, by reflecting the degree of bias of the support 190. The AR device 1000 may directly calculate the coordinate values 102 corresponding to the feature points of the eyes in the coordinate system of the IR detector, based on the calibrated positions of the lights 102-1 corresponding to the feature points of the eyes in the light array 102. In this case, the AR device 1000 may calculate the coordinate value of the pupil feature point and the coordinate value of the glint feature point of the eyes calibrated by reflecting the degree of bias of the temple 191 of the AR device 1000 and/or the degree of bias of the nose support 192. The calibrated coordinate values may be input to a mapping function.

In operation S1225, the AR device 1000 may identify the pupil position of the user's eyes based on the IR light reflected from the light reflector 1400. For example, when the light receiver 1520 is an IR camera, the AR device 1000 may identify the pupil position of the user's eyes within an image captured by the IR camera from the image. Alternatively, for example, when the light receiver 1520 is an IR detector, the AR device 1000 may analyze the IR light sequentially obtained by the IR detector, thereby calculating the pupil position of the user's eyes. The AR device 1000 may identify the pupil central point of the user's eyes, thereby identifying the pupil position of the user's eyes.

In operation S1230, the AR device 1000 may obtain a gaze direction of the user. The AR device 1000 may calculate a position of the center of the user's eyes. The center of the user's eyes may be the center of user's eyeballs. The AR device 1000 may calculate the position of the center of the user's eyes, based on the pupil position of the user's eyes and the degree of bias of the support 190. For example, the processor 1800 may calculate the position of the center of the user's eyes so that a value calculated based on a matrix for calibrating the degree of bias of the support 190, a value indicating the position of the center of the user's eyes and a bias of axis of the image obtained by capturing the user's eyes can be a value of the pupil position of the user's eyes obtained by the pupil position detection code 1760. For example, the center of the eye may be the center of the eyeball, and the position of the center of the user's eyes may have a 3D coordinate value in a coordinate system of a real space.

The AR device 1000 may calculate a position of the gaze point of the user. In order to calculate the position of the gaze point of the user, the AR device 1000 may previously generate a mapping function for calculating the position of the gaze point from features of the user's eyes. The mapping function is a function for calculating the position of the gaze point of the user in consideration of features of the user's eyes and bias information of the support 190, and may be generated during a calibration process of the calibration code 1780. For example, the position of the gaze point may have a 3D coordinate value in the coordinate system in the real space, but the disclosure is not limited thereto. For example, the position of the gaze point may have a coordinate value in the coordinate system of the waveguide 170, but is not limited thereto.

The AR device 1000 may calibrate the features related to the user's gaze based on the degree of bias obtained from the bias determination code 1750. Also, the AR device 1000 may apply the features related to the user's gaze calibrated based on the degree of bias to the mapping function, thereby calculating the position of the gaze point of the user. Also, a gaze direction of the user may be determined based on the position of the central point of the user's eyes and the gaze point of the user calculated by the gaze determination code 1770.

Meanwhile, the AR device 1000 may calibrate the mapping function based on the bias angle of the support 190. The AR device 1000 may calibrate the mapping function for obtaining the gaze point of the user based on a default bias angle and features of eyes.

For example, when the light receiver 1520 is an IR camera, the AR device 1000 may display a target point for calibration through the waveguide170, and capture the user's eyes looking at the target point by using the IR camera. In addition, the processor 1800 may identify and analyze a pattern within the image obtained by capturing the user's eyes, thereby obtaining a bias angle of the support 190. In addition, the AR device 1000 may detect positions of the feature points related to the user's eyes from the image obtained by capturing the user's eyes, and input the positions of the feature points of the user's eyes and the bias angle of the support 190 into the mapping function. The AR device 1000 may calibrate the mapping function so that a position value of the target point may be output from the mapping function to which the positions of the feature points of the user's eyes and the bias angle of the support 190 are input.

For example, when the light receiver 1520 is an IR detector, the AR device 1000 may display the target point for calibration on the waveguide170 and control the IR scanner to emit IR light for scanning the user's eyes looking at the target point. In addition, the AR device 1000 may receive and analyze IR light reflected from the user's eyes through the IR detector, identify a pattern of the light reflector 1400, and estimate the bias angle of the temple 191. The AR device 1000 analyze the IR light based on the bias angle of the temple 191, thereby identifying positions of the calibrated feature points of eyes. For example, when the AR device 1000 estimates the positions of the feature points of eyes by using the IR scanner and the IR detector, because results of estimating the positions of the feature points of eyes are affected by an operating angle of the IR scanner, the positions of the feature points of eyes may be calibrated based on the bias of the support 190 by calculating a value obtained by subtracting the bias angle of the support 190 from the operating angle of the IR scanner.

In addition, the AR device 1000 may input the positions of the calibrated feature points of the eyes into the mapping function, and calibrate the mapping function so that the position value of the target point may be output from the mapping function in which the calibrated positions of the feature points of the eyes are input.

An example embodiment of the disclosure may be implemented as a recording medium including computer-readable instructions such as a computer-executable program module. According to an example embodiment, the computer-readable instructions may be computer codes, which are implemented as one or more computer-executable program modules. A computer-readable medium may be any available medium which is accessible by a computer, and may include a volatile or non-volatile medium and a removable or non-removable medium. Also, the computer-readable medium may include computer storage medium and communication medium. The computer storage media include both volatile and non-volatile, removable and non-removable media implemented in any method or technique for storing information such as computer readable instructions, data structures, program codes, program modules or other data. The communication medium may typically include computer-readable instructions, data structures, or other data of a modulated data signal such as program modules.

A computer-readable storage medium may be provided in a form of a non-transitory storage medium. Here, the term 'non-transitory storage medium' refers to a tangible device and does not include a signal (e.g., an electromagnetic wave), and does not distinguish between a case where data is stored in a storage medium semi-permanently and a case where data is stored temporarily. For example, the non-transitory storage medium may include a buffer in which data is temporarily stored.

According to an example embodiment of the disclosure, the method according to various embodiments of the disclosure disclosed herein may be included in a computer program product and provided. The computer program product may be traded between a seller and a purchaser as a commodity. The computer program product may be distributed in a form of a machine-readable storage medium (e.g., compact disk read only memory (CD-ROM)), or may be distributed online (e.g., downloaded or uploaded) through an application store (e.g., PlayStore™) or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

In addition, in the specification, the term "unit" may be a hardware component such as a processor or a circuit, and/or a software component executed by a hardware component such as a processor.

Also, in the specification, the expression "include at least one of a, b or c" means "include only a", "include only b", "include only c", "include a and b", "include b and c", "include a and c", or "include a, b, and c".

The above-described description of the disclosure is provided only for illustrative purposes, and those of skill in the art will understand that the disclosure may be easily modified into other detailed configurations without modifying technical aspects and essential features of the disclosure. Therefore, it should be understood that the above-described embodiments are exemplary in all respects and are not limited. For example, the elements described as single entities may be distributed in implementation, and similarly, the elements described as distributed may be combined in implementation.

The scope of the disclosure is not defined by the detailed description of the disclosure but by the following claims, and all modifications or alternatives derived from the scope and spirit of the claims and equivalents thereof fall within the scope of the disclosure.

The invention claimed is:

1. An augmented reality (AR) device comprising:
   a waveguide;
   a light reflector on which a pattern is formed;
   a support configured to secure the AR device to a face of a user, the support comprising a temple extending from a frame around the waveguide to be positioned on an ear of the user;
   a light emitter and a light receiver installed on the support; and
   at least one processor configured to:
     control the light emitter to emit first light toward the light reflector on which the pattern is formed,
     receive, through the light receiver, second light reflected by an eye of the user and reflected by the light reflector,
     identify a reflected pattern corresponding to the pattern formed on the light reflector from the second light,
     identify a degree of bias of the temple with respect to the frame by comparing the identified reflected pattern with a pattern identified from a light received by the light receiver before the temple is biased,
     obtain gaze information of a user of the AR device based on the identified reflected pattern, and
     perform calibration on the gaze information based on the degree of bias of the temple with respect to the frame,
   wherein the first light emitted toward the light reflector is reflected by the light reflector and directed toward the eye of the user, and
   wherein the second light received by the light receiver comprises light from the first light directed toward the eye of the user being reflected by the eye of the user, reflected back by the light reflector, and directed toward the light receiver.

2. The AR device of claim 1, wherein the light reflector is formed on the waveguide.

3. The AR device of claim 1, wherein the at least one processor is further configured to:
   generate a mapping function for calculating a position of a gaze point of the user based on the degree of bias of the support with respect to the frame, and based on the mapping function and the degree of bias of the support with respect to the frame, obtain the gaze information of the user.

4. The AR device of claim 3, wherein the at least one processor is further configured to, based on the second light received by the light receiver, obtain a position of one or more feature points corresponding to the eye of the user.

5. The AR device of claim 4, wherein the at least one processor is configured to input the position of the one or more feature points corresponding to the eye of the user and the degree of bias of the support with respect to the frame into the mapping function and calculate the position of the gaze point of the user.

6. The AR device of claim 3, wherein the at least one processor is further configured to:
   display a target point at a specific position on the waveguide in order to calibrate the mapping function,
   receive third light reflected by the eye of the user looking at the displayed target point through the light receiver, and
   calibrate the mapping function based on the third light reflected by the eye of the user looking at the displayed target point.

7. The AR device of claim 6, wherein, for calibration of the mapping function, the at least one processor is further configured to:
   based on the third light reflected by the eye of the user looking at the displayed target point, identify the reflected pattern of the light reflector,
   based on the identified reflected pattern, identify the degree of bias of the support, and
   based on the third light reflected by the eye of the user looking at the displayed target point, obtain a position of one or more feature points corresponding to the eye of the user looking at the displayed target point.

8. The AR device of claim 7, wherein the at least one processor is further configured to:
   input the degree of bias of the temple and the position of the one or more feature points into the mapping function, and
   calibrate the mapping function so that a position value of the target point is output from the mapping function.

9. The AR device of claim 1, wherein the light reflector is coated on the waveguide.

10. The AR device of claim 1, wherein the light reflector comprises at least one of silver, gold, or copper.

11. The AR device of claim 1, wherein the pattern formed on the light reflector comprises one of a dot pattern, a line pattern, a grid pattern, or a 2D marker.

12. A method, performed by an augmented reality (AR) device, of detecting a gaze of a user, the method comprising:
   emitting, by a light emitter installed in a support of the AR device, first light toward a light reflector on which a pattern is formed, the first light emitted by the light emitter being directed toward an eye of a user wearing the AR device, the support comprising a temple extending from a frame around a waveguide to be positioned on an ear of the user;
   receiving, by a light receiver installed on the support configured to secure the AR device to a face of the user, second light reflected by the eye of the user and reflected by the light reflector;
   identifying a reflected pattern corresponding to the pattern formed on the light reflector from the second light;
   identifying a degree of bias of the temple with respect to the frame by comparing the identified reflected pattern with a pattern identified from a light received by the light receiver before the temple is biased;
   obtaining gaze information of the user based on the identified pattern; and
   calibrating the gaze information based on the degree of bias of the temple with respect to the frame,
   wherein the second light received by the light receiver comprises light from the first light directed toward the eye of the user being reflected by the eye of the user, reflected back by the light reflector, and directed toward the light receiver.

13. The method of claim 12, further comprising generating a mapping function for calculating a position of a gaze point of the user based on the degree of bias of the support with respect to the frame,
   wherein the calibrating of the gaze information comprises calculating the position of the gaze point of the user based on the mapping function and the degree of bias of the support with respect to the frame.

14. The method of claim 13, further comprising, based on the second light received by the light receiver, obtaining a position of one or more feature points corresponding to the eye of the user,
   wherein the calibrating of the gaze information comprises inputting the position of the one or more feature points corresponding to the eye of the user and the degree of bias of the support with respect to the frame into the mapping function and calculating the position of the gaze point of the user.

15. A non-transitory computer-readable recording medium having recorded thereon a program for executing the method of claim 11 on a computer.

* * * * *